United States Patent [19]

Katayose et al.

[11] Patent Number: 5,255,193
[45] Date of Patent: Oct. 19, 1993

[54] TRACTION CONTROL SYSTEM FOR CONTROLLING ENGINE OUTPUT AND BRAKE FOR MAINTAINING OPTIMUM WHEEL TRACTION WITH ROAD FRICTION LEVEL DEPENDENT BRAKE CONTROL

[75] Inventors: Shinji Katayose, Atsugi; Minoru Tamura, Yokohama; Toru Iwata, Yokosuka, all of Japan

[73] Assignee: Nissan Motor Company, Yokohama, Japan

[21] Appl. No.: 752,198

[22] Filed: Aug. 20, 1991

Related U.S. Application Data

[63] Continuation of Ser. No. 349,739, May 10, 1989, abandoned.

[30] Foreign Application Priority Data

May 12, 1988 [JP] Japan ................ 63-113447

[51] Int. Cl.⁵ ............................................. B60T 8/58
[52] U.S. Cl. ............................ 364/426.02; 180/197; 303/103; 303/106
[58] Field of Search ............ 364/426.02, 426.03; 180/197; 303/95, 102, 103, 106

[56] References Cited

U.S. PATENT DOCUMENTS

| | | | |
|---|---|---|---|
| 4,715,662 | 12/1987 | Van Zanten et al. | 364/426.02 |
| 4,755,945 | 7/1988 | Kade et al. | 364/426.02 |
| 4,760,893 | 8/1988 | Sigl et al. | 364/426.02 |
| 4,762,196 | 8/1988 | Harada et al. | 180/197 |
| 4,794,538 | 12/1988 | Cao et al. | 364/426.02 |
| 4,800,498 | 1/1989 | Matsui et al. | 364/426.02 |
| 4,809,182 | 2/1989 | Matsuda | 364/426.02 |
| 4,818,037 | 4/1989 | McEnnan | 364/426.02 |
| 4,862,368 | 8/1989 | Kost et al. | 364/426.02 |
| 4,865,397 | 9/1989 | Inoue et al. | 180/197 |
| 4,866,623 | 9/1989 | Ise et al. | 180/197 |
| 4,873,638 | 10/1989 | Shiraishi et al. | 364/426.02 |
| 4,873,639 | 10/1989 | Sato et al. | 364/426.02 |
| 4,884,651 | 12/1989 | Harada et al. | 364/426.03 |
| 4,886,322 | 12/1989 | Atkins | 364/426.02 |

*Primary Examiner*—Gary Chin
*Attorney, Agent, or Firm*—Foley & Lardner

[57] ABSTRACT

A traction control system monitors wheel slippage and variation of wheel slippage for detecting road friction condition. The traction control system selects brake control characteristics depending upon the detected road friction condition.

22 Claims, 18 Drawing Sheets

|  | S11 | S12 |  |
|---|---|---|---|
| + | LOWER RATE APPLICATION | HIGHER RATE APPLICATION | HIGHER RATE APPLICATION |
| $\dot{S}_{21}$ | LOWER RATE RELEASE | LOWER RATE APPLICATION | HIGHER RATE APPLICATION |
| 0 | LOWER RATE RELEASE | HOLD | LOWER RATE APPLICATION |
| $\dot{S}_{22}$ | HIGHER RATE RELEASE | LOWER RATE RELEASE | HOLD |

TRACTION CONTROL SYSTEM FOR CONTROLLING ENGINE OUTPUT AND BRAKE FOR MAINTAINING OPTIMUM WHEEL TRACTION WITH ROAD FRICTION LEVEL DEPENDENT BRAKE CONTROL

This application is a continuation of application Ser. No. 07/349,739, filed May 10, 1989, now abandoned.

BACKGROUND OF THE INVENTION

1. Field of the Invention

The present invention relates generally to a traction control system for an automotive vehicle for providing optimum wheel traction of vehicular wheels. More specifically, the invention relates to a technology for controlling vehicular brake systems for recovering wheel traction, in which operation of the braking system is controlled depending upon the friction level of a road surface.

2. Description of the Background Art

Japanese Patent First (unexamined) Publication (Tokkai) Showa 61-85248 discloses a traction control system for an automotive vehicle. The disclosed traction control system is cooperated with a vehicular brake system for applying a braking force for the road wheel for deceleration of the wheel and whereby recovering wheel traction. In such prior proposed traction control system, braking force is established and released depending upon the wheel slippage and variation speed of the wheels slippage. The brake force building up rate cannot be adjusted and thus is increased at a fixed rate. However, the effect of the braking force can be variable depending upon the road surface friction level. Namely, when the vehicle is on a relatively low friction road, the braking speed tends to be low to cause delay in recovery of the wheel traction when the fixed brake pressure building up rate is determined for optimization of the braking effect on a relatively high road surface friction condition. On the other hand, if the fixed rate is relatively high for high braking effect, braking force becomes excessive to cause excessive deceleration of the wheel for degradation of vehicular drivability. Furthermore, a relatively high braking force building up rate may cause excess force in a high friction road for excess deceleration for the wheel for degradation of the vehicle drivability.

SUMMARY OF THE INVENTION

Therefore, it is an object of the invention to provide a traction control system which can provide optimum braking effect at any vehicle traveling condition.

Another object of the invention to provide a traction control system which can control the brake system depending upon the road surface condition.

In order to accomplish the aforementioned and other objects, a traction control system according to the invention monitors wheel slippage and variation of wheel slippage for detecting road friction conditions. The traction control system selects brake control characteristics depending upon the detected road friction condition.

According to one aspect of the invention, a traction control system for an automotive vehicle comprises:

first means, associated with an automotive engine and a manually operable accelerator means, for controlling engine output;

second means, associated with an automotive brake system, for adjusting braking pressure to be generated in a wheel cylinder of a driving wheel which is coupled with the automotive engine to receive the engine output so as to be driven by the engine output;

third means for monitoring rotation speed of the driving wheel to produce a driving wheel speed indicative signal;

fourth means for monitoring a vehicular body speed representative parameter for producing a vehicular body speed representative signal;

fifth means for deriving a wheel slippage on the driving wheel on the basis of the wheel speed indicative signal and the vehicular body speed representative signal;

sixth means for generating a first control signal on the basis of the wheel slippage for controlling operation of the first means in order to adjust the engine output for suppressing wheel slippage; and seventh means for generating a second control signal on the basis of the wheel slippage for operating the second means for adjusting braking pressure in order to suppress the wheel slippage, the seventh means varying the variation rate of the braking pressure according to the magnitude of the wheel slippage and the variation of the wheel slippage.

In the preferred construction, the second means may be operable in a first mode for increasing braking pressure in the wheel cylinder and a second mode for decreasing braking pressure in the wheel cylinder, and the seventh means varies the variation rate of the braking pressure at least in one of the first and second modes. The second means is further operable in a third mode for holding the braking pressure in the wheel cylinder, and the seventh means varies the variation rate of the braking pressure by alternating the mode of the second means between at least one of the first and second modes and the third mode.

In one of the practical construction, the the second means comprises:

a first valve means disposed within a brake circuit connecting the wheel cylinder to a braking pressure source which is associated with a manually operable braking member to generate a fluid pressure to be supplied to the wheel cylinder depending upon the magnitude of depression of the braking member, the first valve means being operable in a normal mode position in the second mode of the second means to establish communication of the wheel cylinder with the pressure source for controlling braking pressure depending upon the magnitude of depression of a braking member, and in a traction control mode in the first mode for disconnecting the wheel cylinder from the pressure sources and forming a closed circuit including the wheel cylinder to compress the working fluid therein for increasing braking force in the wheel cylinder; and a second valve means associated with the first valve means and controlled by the second means, for switching the operational mode between the normal mode and the traction control mode. The first valve means may operate to increase the braking pressure in the wheel cylinder and to hold the braking force constant, in the traction control mode.

Alternatively, the second means may also comprises:

a first valve means disposed within a brake circuit connecting the wheel cylinder to a braking pressure source which is associated with a manually operable braking member to generate a fluid pressure to be supplied to the wheel cylinder depending upon the magnitude of depression of the braking member, the first valve means being operable in a normal mode position in the second mode of the second means to establish communication of the wheel cylinder with the pressure source for controlling braking pressure depending upon the magnitude of depression of a braking member, in a first traction control mode in the first mode for disconnecting the wheel cylinder from the pressure source and forming a closed circuit including the wheel cylinder to compress the working fluid therein for increasing braking force in the wheel cylinder, and in a second traction mode in the third mode of the second means for blocking fluid communication of the wheel cylinder to maintain the braking pressure constant; and a second valve means associated with the first valve means and controlled by the second means, for switching the operational mode between the normal mode and the traction control mode.

In such case, the first valve means is connected to a pressurized fluid source to be supplied a pressurized fluid therefrom. The pressurized fluid source includes a fluid pump unit and a pressure accumulator which are cooperative for maintaining the fluid pressure to be supplied to the first valve means higher than a predetermined value.

In the practical traction control process, the seventh means may derive the variation rate of the braking pressure in the wheel cylinder on the basis of the magnitude of the wheel slippage and the variation of the wheel slippage. In such case, the seventh means controls the second means for increasing the braking pressure at a first higher rate and a second lower rate depending upon the magnitude of the wheel slippage and the variation of the wheel slippage. The seventh means selects the second lower rate in response to increasing of the magnitude of the wheel slippage across a predetermined wheel slippage criterion and selects the first higher rate when the rate of variation of the wheel slippage increases across a predetermined wheel slippage variation rate criterion. In the alternative or in combination with the braking pressure control during increasing of braking pressure, the seventh means may control the second means for decreasing the braking pressure at a first higher rate and a second lower rate depending upon the magnitude of the wheel slippage and the variation of the wheel slippage. In such case, the seventh means may select the fourth lower rate in response to zero-crossing of decreasing variation rate of the wheel slippage and selects the third higher rate when the magnitude of the wheel slippage decreases across a predetermined wheel slippage criterion.

In the preferred embodiment, the traction control system may further comprise means for measuring an elapsed time in a period to maintain decreasing of the braking pressure in the fourth lower rate, and the seventh means further varies the braking pressure variation rate depending upon the elapsed time while the braking pressure is decreased in the fourth lower rate.

The sixth means operates the first means for adjusting a characteristics throttle valve angular displacement in relation to the operational magnitude of the accelerator means depending upon the magnitude of wheel slippage. The sixth means may derive to limit maximum throttle valve open angle depending upon the magnitude of wheel slippage. Practically, the sixth means periodically decreases the limited maximum throttle valve open angle while the magnitude of wheel slippage is maintained to be greater than or equal to a predetermined first wheel slippage threshold value. The sixth means is also responsive to a wheel slippage magnitude greater than or equal to a predetermined wheel slippage threshold for setting the limited maximum throttle open angle at a predetermined minimum value.

According to another aspect of the invention, a traction control system for an automotive vehicle comprises:

first means, associated with an automotive engine and a manually operable accelerator means, for controlling engine output;

second means, associated with an automotive brake system, for adjusting braking pressure to be generated in a wheel cylinder of a driving wheel which is coupled with the automotive engine to receive the engine output so as to be driven by the engine output;

third means for monitoring rotation speed of the driving wheel to produce a driving wheel speed indicative signal;

fourth means for monitoring a vehicular body speed representative parameter for producing a vehicular body speed representative signal;

fifth means for deriving a wheel slippage on the driving wheel on the basis of the wheel speed indicative signal and the vehicular body speed representative signal;

sixth means for generating a first control signal on the basis of the wheel slippage for controlling operation of the first means in order to adjust the engine output for suppressing wheel slippage; and seventh means for generating a second control signal on the basis of the wheel slippage for operating the second means for adjusting braking pressure in order to suppress the wheel slippage, the second control signal being variable of duty cycle consisted of a pressure varying period and pressure holding period depending upon the magnitude of the wheel slippage and the variation of the wheel slippage.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
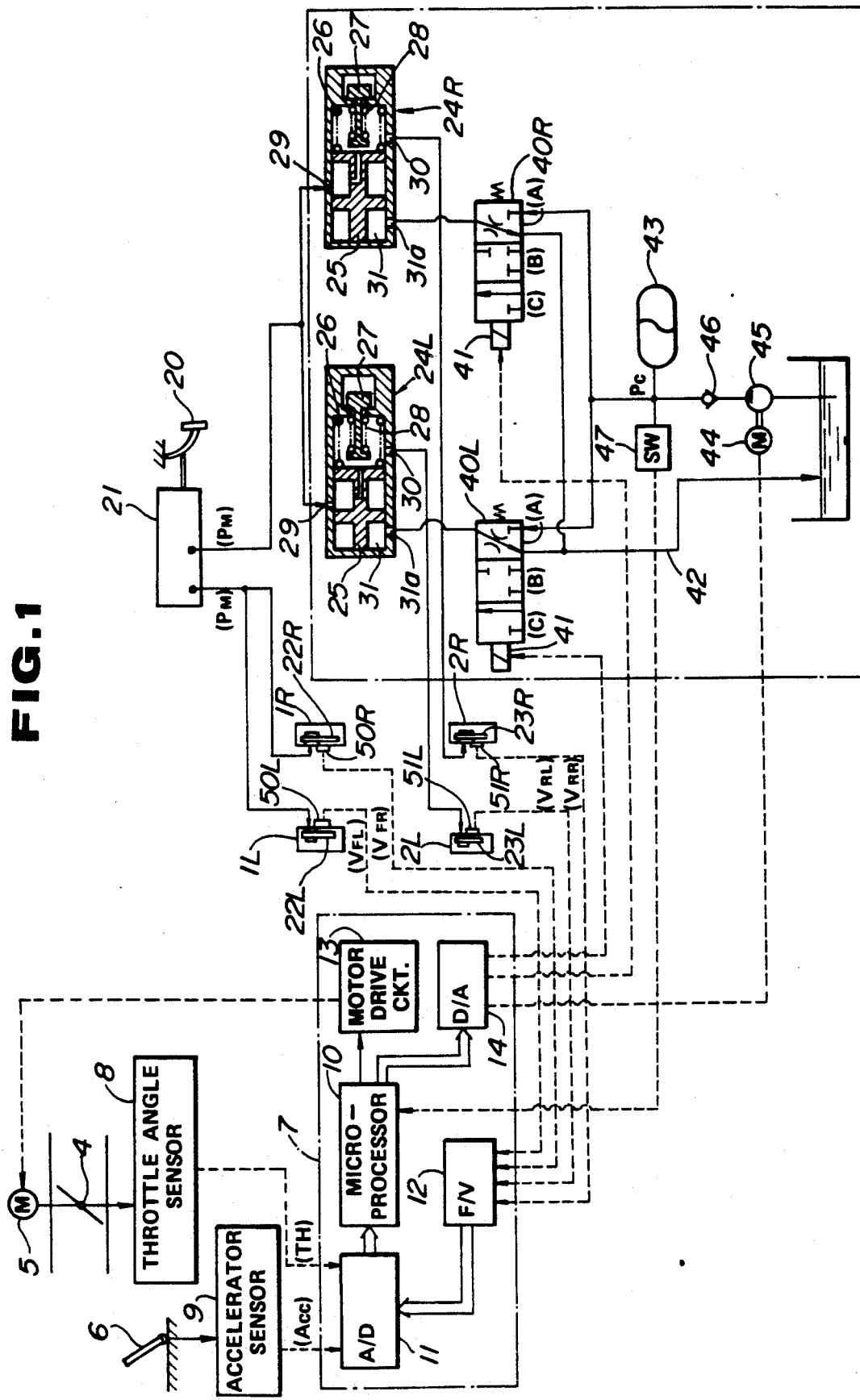
FIG. 1 is a block diagram of the preferred embodiment of a traction control system according to the present invention.
Figure 2:
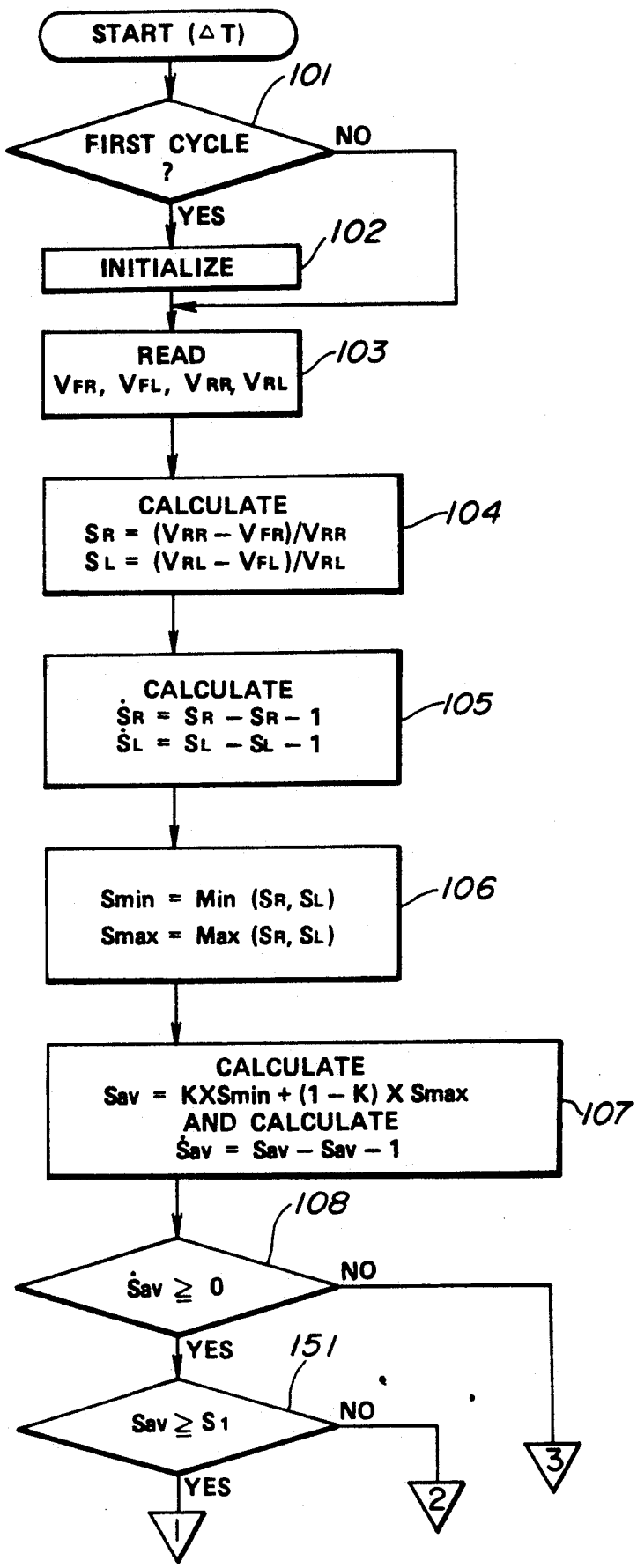
FIGS. 2 through 11 show a sequence of flowchart of a traction control program to be executed in the preferred embodiment of the traction control system of FIG. 1.
Figure 3:
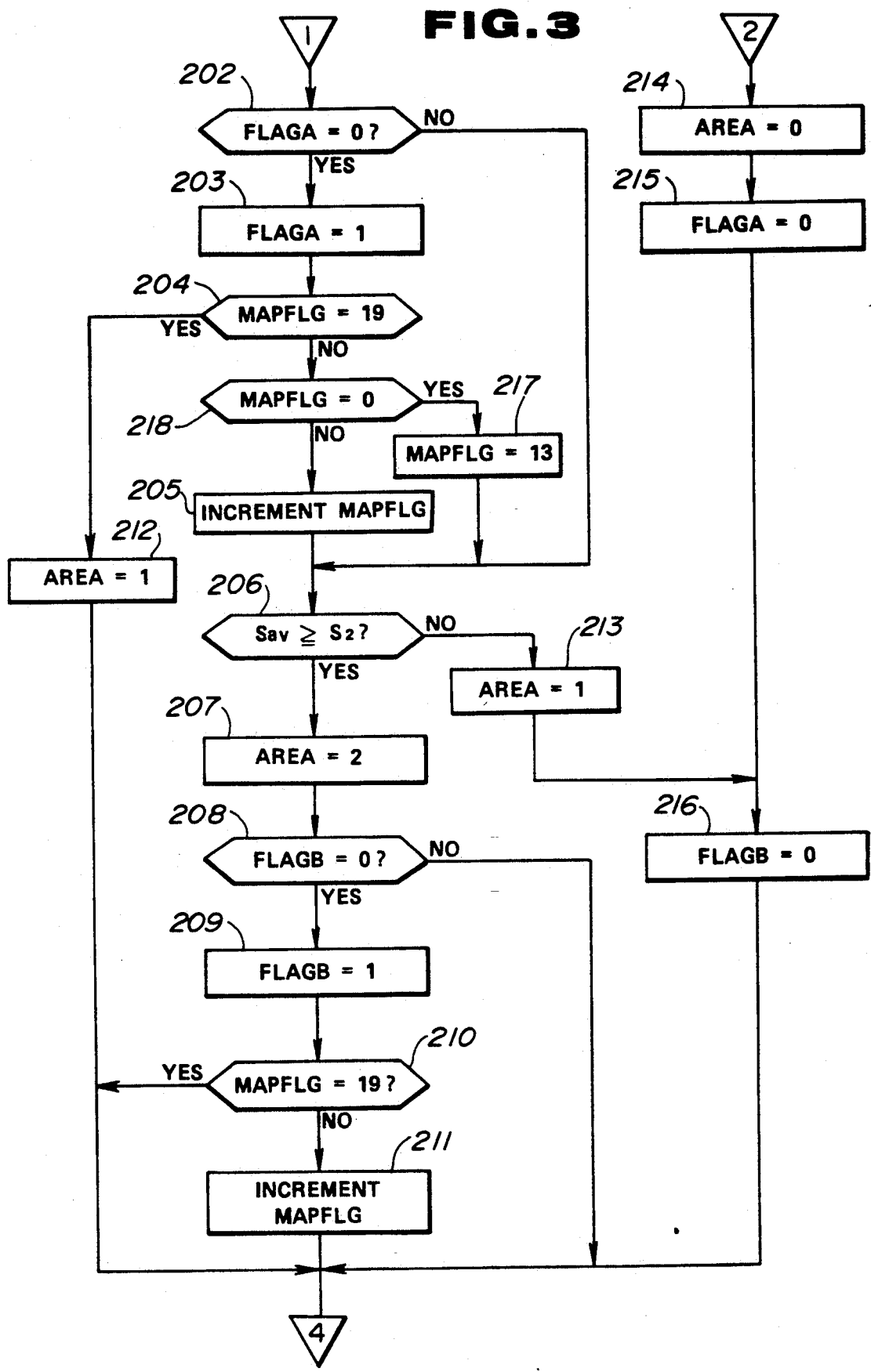

Referring now to the drawings particularly to FIG. 1, the preferred embodiment of a traction control system, according to the present invention, is illustrated in terms of application for a vehicle having left and right driven wheels 1L and 1R and left and right driving wheels 2L and 2R. As can be appreciated, the driven wheels 1L and 1R are not connected to an automotive internal combustion engine and thus rotates freely according to traveling speed of the vehicle. On the other hand, the driving wheels 2L and 2R are connected to the automotive engine through known power train to be driven by the driving torque distributed through the power train. In the shown embodiment, the vehicle illustrated has rear-wheel drive power train layout. Therefore, the driven wheels 1L and 1R are front wheels and the driving wheels 2L and 2R are rear wheels. The engine includes an induction system, in which a throttle valve 4 is disposed for adjusting intake air flow rate depending upon a demand for engine output.

In the shown embodiment, the throttle valve 4 is associated with a stepping motor 5 which serves as a servo motor for controlling the angular position of the throttle valve. The stepping motor 5 is connected to a control unit 7 for controlling the driving direction, i.e. forward and reverse direction, and for controlling the step number for driving in the selected direction. The control unit 7 normally derives a throttle servo control signal defining the number of steps and direction to drive the stepping motor 5 on the basis of the magnitude of depression of an accelerator pedal 6, which depression magnitude of the accelerator pedal is detected by means of an accelerator sensor 9. The accelerator sensor 9 produce an accelerator position indicative signal ACC indicative of the monitored magnitude of depression of the accelerator pedal 6. A throttle angle sensor 8 is associated with the throttle valve 4 for monitoring the angular position of the throttle valve 4 to produce a throttle angle position signal TH indicative thereof.

The control unit 7 includes a microprocessor 10. An analog-to-digital (A/D) converter 11 is provided to receive the analog form accelerator position indicative signal ACC and the throttle angle position signal TH to convert them into digital signals for the microprocessor. A frequency-to-voltage (F/v) converter 12 is also provided for receiving wheel speed indicative alternating current from frequency signals $V_{FL}$, $V_{FR}$, $V_{RL}$ and $V_{RR}$ produced by wheel speed sensors 50L, 50R, 51L and 51R. Each of these wheel speed sensors 50L, 50R, 51L and 51R monitors the rotation speed of the associated one of wheel speed to produce the alternating currents, which has a frequency representative of rotation speed of the associated wheel.

Each of front-left, front-right, rear-left and rear-right wheels 1L, 1R, 2L and 2R is associated with wheel cylinders 22L, 22R, 23L and 23R connected to a master cylinder 21 which is mechanically connected to a brake pedal 20, via a hydraulic brake circuits. Traction control valves 24L and 24R are disposed in the brake circuits connecting the master cylinder 21 to the wheel cylinders 23L and 23R. Each of the traction control valves 24L and 24R has a valve spol 25. The valve spool 25 is associated with a bias spring 26 which normally biases the valve spool toward left in the drawing. A plunger 27 is also biased toward left in the drawing by means of a bias spring 28. Therefore, the valve spool 25 and the plunger 27 are normally placed at the position illustrated in FIG. 1.

At this valve position, the braking fluid pressure $P_M$ built up in the master cylinder 21 and introduced into a valve housing via an inlet port 29 directly flows through a communication path defined through the valve spool and is fed out through an outlet port 30. On the other hand, when the valve spool 25 is shifted toward right in the drawing, the downstream end of the communication path formed through the valve spool 25 is closed by the associated end of the plunger 27 to block fluid communication between the inlet port 29 and the outlet port 30. By blocking fluid communication between the volume of the chamber defined in the valve housing, the outlet port 30 is disconnected to the brake circuit. At this position, further shifting of the valve spool 25 causes compression of the chamber to increase the fluid pressure in the wheel cylinders 23L and 23R. The braking force in the wheel cylinder thus increased is held constant at a level where the valve spool 25 ceases shifted toward the right.

Figures 15, 16:
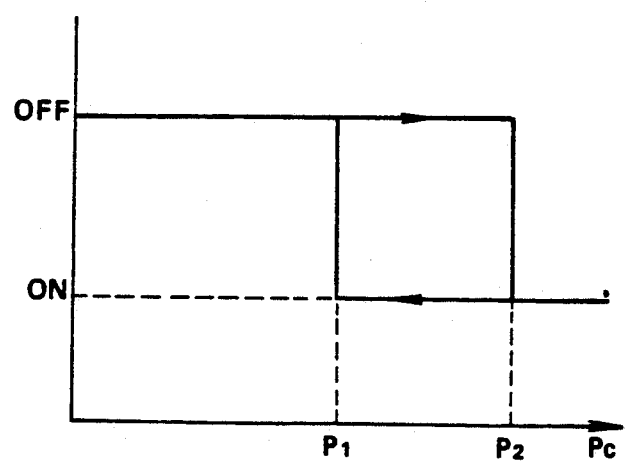
FIG. 15 is an illustration of a mode selector table for selecting mode of operation the brake system in terms of the magnitude of wheel slippage and variation of wheel slippage.
FIG. 16 is a chart showing variation of pressure switch signal level depending upon a fluid pressure in a pressure accumulator.

The position of the valve spool 25 is controlled by fluid pressure in a chamber 31 which is connected to an electromagnetic valve 40L and 40R. The electromagnetic valves 40L and 40R respectively comprise three position valves. Each of the electromagnetic valves 40L and 40R has one port connected to the port 31a of associated one of the traction control valves 24L and 24R. Also, the electromagnetic valves 40L and 40R have inlet ports connected to a fluid pump 45 via an one-way check valve 46 and a supply line, and to a pressure accumulator 43, and drain ports connected to a fluid reservoir through a drain line 42. As seen, the fluid pump 45 is associated with an electric motor 44 to be driven by the driving torque of the latter. A pressure switch 47 is provided in the supply line to monitor the fluid pressure Pc accumulated in the pressure accumulator 43 to stop driving of the electric motor 44 when the fluid pressure Pc accumulated in the pressure accumulator is maintained higher than or equal to a predetermined value. As seen from FIG. 16, the pressure switch 47 is provided with different ON-set pressure point $P_1$ and OFF-set pressure point $P_2$ so as to provide hysterisis in the pump control. Namely, The ON-set pressure point $P_1$ is set at a lower value than the OFF-set pressure point $P_2$. Therefore, the pressure switch 47 turns ON when the pressure accumulated in the pressure Pc accumulator 43 drops below the ON-set pressure $P_1$ and turns OFF in response to the pressure Pc accumulated in the pressure accumulator rising across the OFF-set pressure point $P_2$.

In order to control operation of the electric motor 44, the pressure switch 47 is connected to the microprocessor 10 of the control unit 7. The microprocessor 10 derives a motor control signal on the basis of the input from the pressure switch 47 and output to the electric motor 44 via a digital-to-analog (D/A) converter 14.

The electromagnetic valves 40L and 40R are provided with electromagnetically operable solenoids 41. The solenoids 41 are connected to the microprocessor 10 via the D/A converter 14. The microprocessor 10 normally places the electromagnetic valves 40L and 40R at the position as illustrated in FIG. 1, in which the port 31a is directly connected to the drain port. Therefore, at the valve position of the electromagnetic valves 40L and 40R as illustrated, the pressure in the chamber 30 is maintained substantially zero. This valve position will be hereafter referred to as "normal valve position (A)". According to the operational magnitude of the solenoids 41, the electromagnetic valves 40L and 40R vary the valve position to disconnect all ports to each other. At this position, the pressure in the chamber 30 is maintained constant at a level immediately before shifting of the valve into this position. The valve position to maintain the pressure in the chamber 30 will be hereafter referred to as "pressure holding valve position (B)". The electromagnetic valves 40L and 40R are further operable to a valve position where the pressure in the chamber 30 is increased. This valve position will be hereafter referred to as "pressure increasing valve position (C)".

The microprocessor 10 performs control operation by executing routines of FIGS. 2 to 8. As set forth above, the microprocessor 10 performs a throttle valve position control operation for controlling the angular position of the throttle valve 4. The microprocessor 10 also performs brake control for controlling the braking force to be applied to the driving wheels 2L and 2R. Furthermore, the microprocessor 10 controls operation of the electric motor 44 to control the operation of the fluid pump 45.

FIGS. 2 to 7 show a sequence of routine as a main routine for traction control. The shown routine is programmed as an interrupt routine for periodically executed at predetermined interval, e.g. every 20 msec, under the control of an operating system which is not shown.

After starting execution of the routine of FIGS. 2 to 7, at a step 101 a check is performed as to whether the current execution cycle is the first cycle after starting the turning ON of the main power. When the current execution cycle is the first cycle and thus the answer at the step 101 is positive, initialization of the system is performed at a step 102. On the other hand, when the current execution cycle is not the first step and thus the answer at the step 101 is negative, the initialization step 102 is jumped.

At a step 103, the wheel speed indicative data $V_{FL}$, $V_{FR}$, $V_{RL}$ and $V_{RR}$ which are derived from the wheel speed indicative signals of the wheel speed sensors 50L, 50R, 51L and 51R by F/V conversion performed by the F/V converter 12, and by performing A/D conversion by the A/D converter 11 are read. Based on the read wheel speed indicative data $V_{FL}$, $V_{FR}$, $V_{RL}$ and $V_{RR}$, wheel slippages $S_L$ and $S_R$ of the driving wheels 2L and 2R are calculated at a step 104. In derivation of the wheel slippages $S_L$ and $S_R$, the driven wheel speed indicative data $V_{FL}$ and $V_{FR}$ are taken as vehicle speed representative data. Namely, since the driven wheels 1L and 1R do not receive the driving torque from the engine and simply rotate according to the vehicle traveling, no wheel slippage will occur on these driven wheels 1L and 1R. Therefore, wheel slippage $S_L$ and $S_R$ at the driving wheels 2L and 2R can be calculated from the following equations:

$$S_L = (V_{RL} - V_{FL})/V_{RL}$$

$$S_R = (V_{RR} - V_{FR})/V_{RR}$$

At a step 105, wheel slippage variation magnitudes $\dot{S}_L$ and $\dot{S}_R$ are derived on the basis of the wheel slippages $S_L$ and $S_R$ derived at the step 104 and the wheel slippages $S_{L-1}$ and $S_{R-1}$ derived in the immediately preceding execution cycle. At the step 105, the wheel slippage variation magnitudes $\dot{S}_L$ and $\dot{S}_R$ are calculated from the following equations $$\dot{S}_L = S_L - S_{L-1}$$

$$\dot{S}_R = S_R - S_{R-1}$$

At a step 106, the wheel slippages $S_L$ and $S_R$ at the left and right driving wheels 2L and 2R are compared to each other. In the step 106, the greater one of wheel slippages is set as select-HIGH slippage $S_{max}$ and the smaller one is set as select-LOW slippage $S_{min}$. At a step 107, weighted means $S_{av}$ of the select-HIGH slippage $S_{max}$ and the select-LOW slippage $S_{min}$ is derived utilizing a weighing coefficient K which is variable in a range between 0.6 to 0.9 for example. Practical calculation of the weighted means $S_{av}$ is derived from the following equation:

$$S_{av} = K \times S_{min} + (1-K) \times S_{max}$$

Then, at the step 107, variation magnitude $\dot{S}_{av}$ of the weighted mean $S_{av}$ is also calculated on the basis of the derived weighted mean $S_{av}$ in the current execution cycle and $S_{av-1}$ according to the following equation:

$$\dot{S}_{av} = S_{av} - S_{av-1}$$

Figure 13:
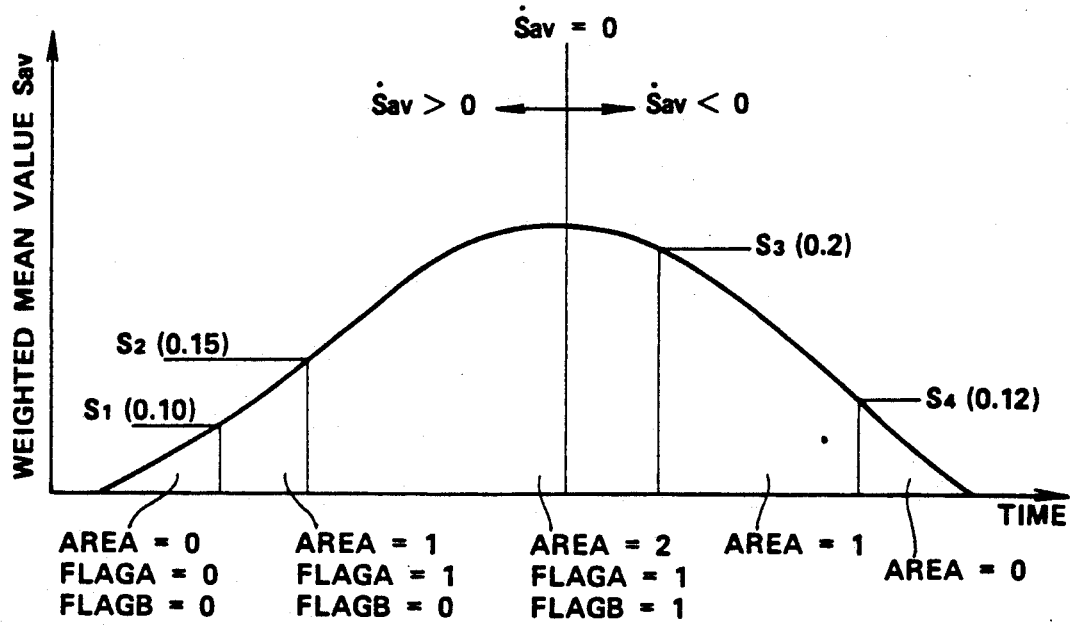
FIG. 13 is a chart showing variation characteristics of weighted mean of wheel slippage, according to which a weighted mean of wheel slippage is derived.

After deriving the variation magnitude $\dot{S}_{av}$ of the weighted mean $S_{av}$, check is performed whether the weighted mean variation magnitude $\dot{S}_{av}$ is a greater than or equal to zero, at a step 108. By checking the weighted mean variation magnitude $\dot{S}_{av}$ at the step 108, discrimination can be made whether wheel slippage is increasing or decreasing. Namely, as shown in FIG. 13, when the weighted mean $S_{av}$ varies as shown, the weighted means variation magnitude $\dot{S}_{av}$ becomes zero at the peak value of the weighted mean $S_{av}$. In the left side of FIG. 13, namely while the weighted mean $S_{av}$ is increasing, the weighted mean variation magnitude $\dot{S}_{av}$ is maintained at positive value. On the other hand, in the right side of FIG. 13, namely while the weighted mean $S_{av}$ is decreasing, the weighted mean variation magnitude $\dot{S}_{av}$ becomes negative value.

If the weighted means variation magnitude $S_{av}$ is smaller than zero and thus the answer at the step 108 is negative, then process jumps to a step 301 (FIG. 4) discussed later. If the weighted means variation magnitude $\dot{S}_{av}$ is positive value and thus the answer at the step 108 is positive, the weighted mean $S_{av}$ is compared with a first wheel slippage criterion $S_1$ at a step 151. In the practical embodiment, the first wheel slippage criterion $S_1$ is set at a value of 0.10. If the weighted mean $S_{av}$ is smaller than the first wheel slippage criterion $S_1$ as checked at the step 151, process jumps to a step 214, in which a slippage area indicative data AREA is set to zero (0). Then, at a step 215, a first wheel slippage indicative flag FLAGA is set to zero (0). Also, at a step 216, a second wheel slippage indicative flag FLAGB is set to zero (0).

On the other hand, if the weighted mean $S_{av}$ is greater than or equal to the first wheel slippage criterion $S_1$, the first wheel slippage indicative flag FLAGA is checked at a step 202. Since the weighted mean $S_{av}$ as checked at the step 151 is greater than or equal to the wheel slippage threshold $S_1$, the negative answer at the step 202 represents that the current execution cycle is the first cycle after the weighted means $S_{av}$ is increased to be greater than or equal to the first wheel slippage criterion $S_1$. Therefore, when the answer at the step 202 is negative, the first wheel slippage indicative flag FLAGA is set to one (1) at a step 203. After setting the first wheel slippage indicative flag FLAGA at the step 203, setting of a throttle valve open angle characteristics is performed through steps 204, 218, 217 and 205. Setting of the throttle valve open angle characteristics is done according to the chart shown in FIG. 14.

Figure 14:
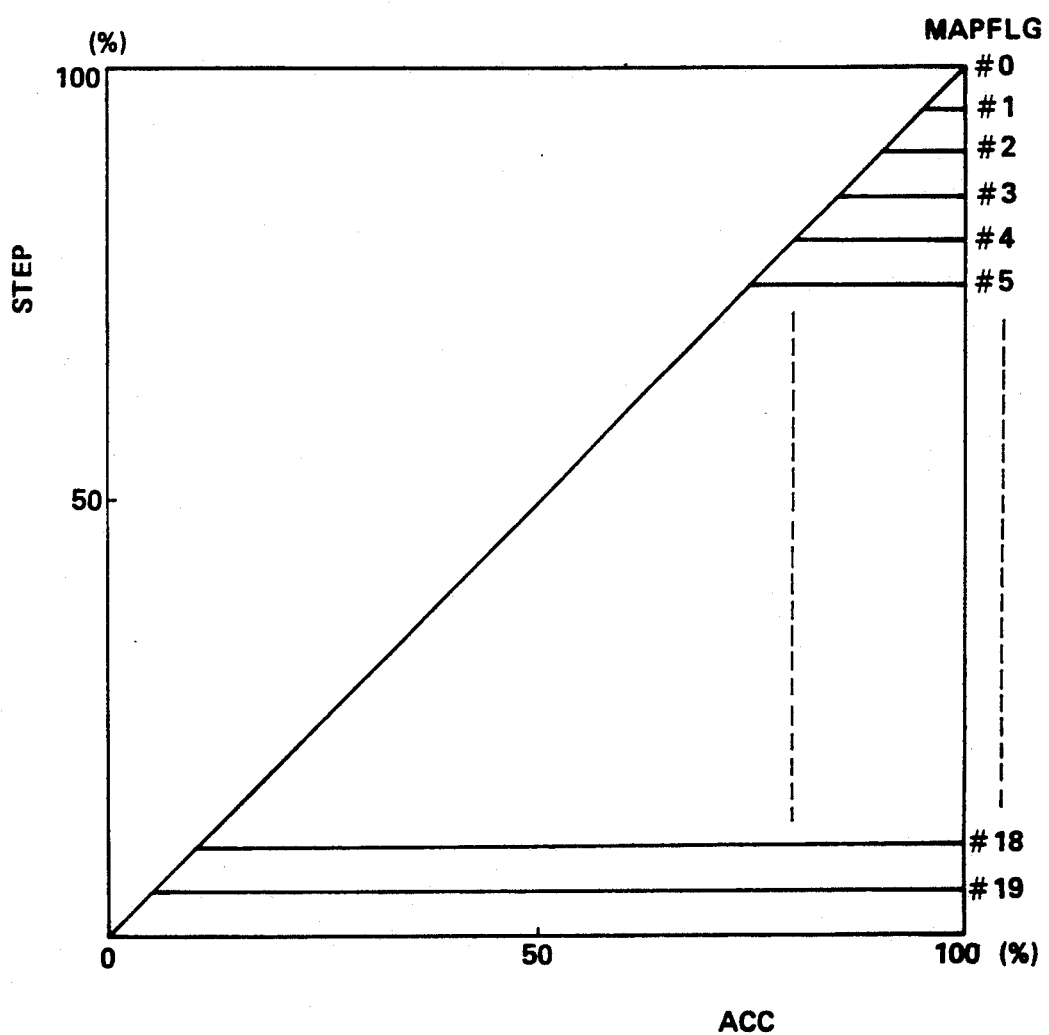
FIG. 14 is a chart showing relationship between depression magnitude ACC of an accelerator pedal and a target throttle valve open angle STEP.

As shown in FIG. 14, the throttle valve open angle characteristics set for determining the step number STEP of the stepping motor in relation to the accelerator pedal position ACC. In the shown chart, step number STEP varies in a range of 0% (corresponding to the throttle valve fully closed position) to 100% (corresponding to the throttle valve fully open position). On the other hand, the accelerator pedal position ACC varies in a range of 0% (corresponding to the accelerator pedal fully released position) to 100% (corresponding to the accelerator pedal fully depressed position). The throttle valve open angle characteristics defines the maximum throttle valve open angle and is represented by a value of throttle valve open angle characteristics indicative flag MAPFLG. In the shown embodiment, the throttle valve open angle characteristics is divided into twenty steps (No. 0 to No. 19). When the throttle valve open angle characteristics MAPFLG is set at a value 0, the 100% of stepping number STEP can be obtained in response to 100% of acceleration pedal position ACC. On the other hand, when the throttle valve open angle characteristics MAPFLG is set at 19, less than 10% of stepping number STEP is obtained even at the 100% of accelerator pedal position ACC.

At a step 204, the value MAPFLG of the throttle valve open angle characteristics is checked whether it is equal to 19. If the answer at the step 204 is positive, the wheel slippage area indicative data AREA is set at one (1) at a step 212.

On the other hand, if the answer at the step 204 is negative, the throttle valve open angle characteristics indicative value MAPFLG is checked against 0 at a step 218. If the throttle open angle characteristics indicative value MAPFLG is 0 as checked at the step 218, then the throttle valve open angle characteristics indicative value MAPFLG is set at 13 which is a predetermined standard traction controlling throttle open angle characteristics, at a step 217. If the throttle open angle characteristics indicative value MAPFLG is other than 0 as checked at the step 218, the value MAPFLG is incremented by 1 at a step 205.

Figure 10:
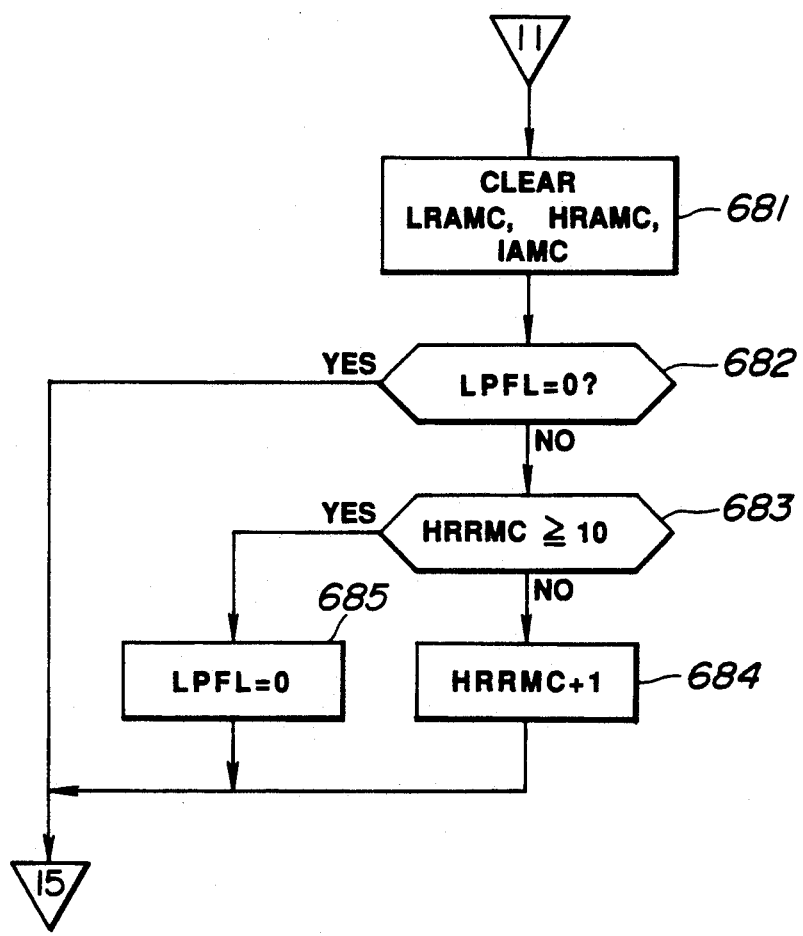
Figure 11:
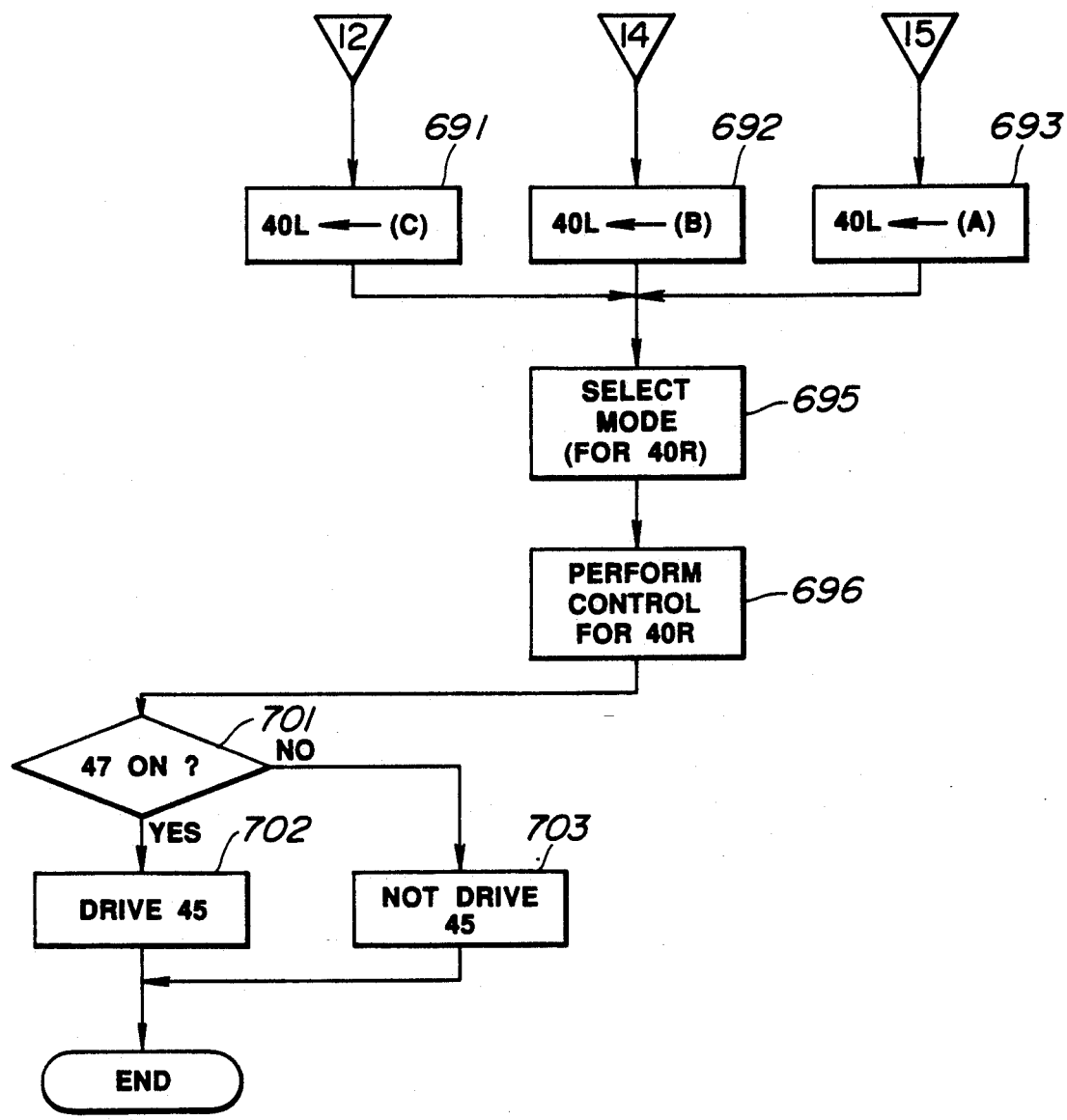
Figure 12:
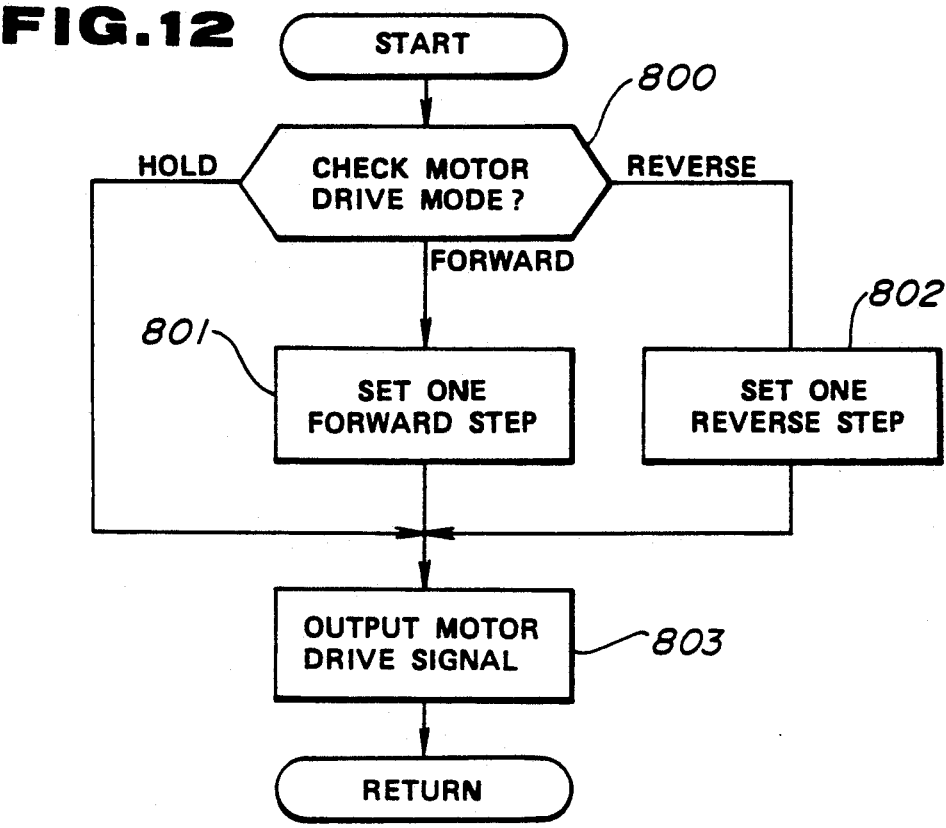
FIG. 12 is a flowchart of an interrupt routine for outputting a motor drive signal.

Therefore, through the processes in the steps 204, 218, 217 and 205 maximum throttle valve open angle can be reduced to be smaller than or equal to a predetermined throttle valve angular position (%) at the throttle open angle characteristics represented by the throttle open angle characteristics indicative value MAPFLG of 13. As can be seen from FIG. 10, though the shown embodiment employs common throttle valve angular displacement rate over all of the throttle valve open angle characteristics, it may be possible to vary not only the maximum open angle but also throttle valve angular displacement rate in relation to the variation of the accelerator pedal position. Such technology for varying the throttle valve angular displacement rate versus the accelerator pedal position variation rate has been disclosed in U.S. Pat. No. 4,809,182 issued on Feb. 2, 1989, and assigned to common assignee to the present invention. The disclosure of the above-identified U.S. Patent will be herein incorporated by reference for the sake of disclosure.

After one of the steps 217 and 205, process goes to a step 206, in which the weighted mean $S_{av}$ of the left and right driving wheel slippages $S_L$ and $S_R$ is compared with a second wheel slippage criterion $S_2$. As seen from FIG. 9, the second wheel slippage criterion $S_2$ is set at greater value, e.g. 0.15 than the first wheel slippage criterion $S_1$ set forth above. When the weighted mean $S_{av}$ is smaller than the second wheel slippage criterion $S_2$, wheel slippage area indicative data AREA is set at one (1), at a step 213. After setting the wheel slippage area indicative data AREA at the step 213, process goes to the step 216. On the other hand, when the weighted mean $S_{av}$ is greater than or equal to the second wheel slippage criterion $S_2$, the wheel slippage area indicative data AREA is set at two (2) at a step 207. Thereafter, the second wheel slippage indicative flag FLAGB is checked whether it is set, at a step 208. The second wheel slippage indicative FLAGB is set when the weighted mean $S_{av}$ increases across the second wheel slippage criterion $S_2$ and maintained in set state while the weighted mean $S_{av}$ is held greater than or equal to the second wheel slippage criterion $S_2$. Since the weighted mean $S_{av}$ greater than the second wheel slippage criterion $S_2$ is already detected at the step 206, the negative answer at the step 208 implies that the current execution cycle is performed immediately after the timing at which the weighted means $S_{av}$ increases across the second wheel slippage criterion or reaches the second wheel slippage criterion $S_2$. Therefore, the second wheel slippage indicative flag FLAGB is set to one (1) at a step 209. After setting the second wheel slippage flag FLAGB at the step 209, the throttle valve open angle characteristics indicative value MAPFLG is checked whether the value is 19 at a step 210. If the throttle valve open angle characteristics indicative value MAPFLG is smaller than 19, the value is incremented by 1 at a step 211.

Figure 4:
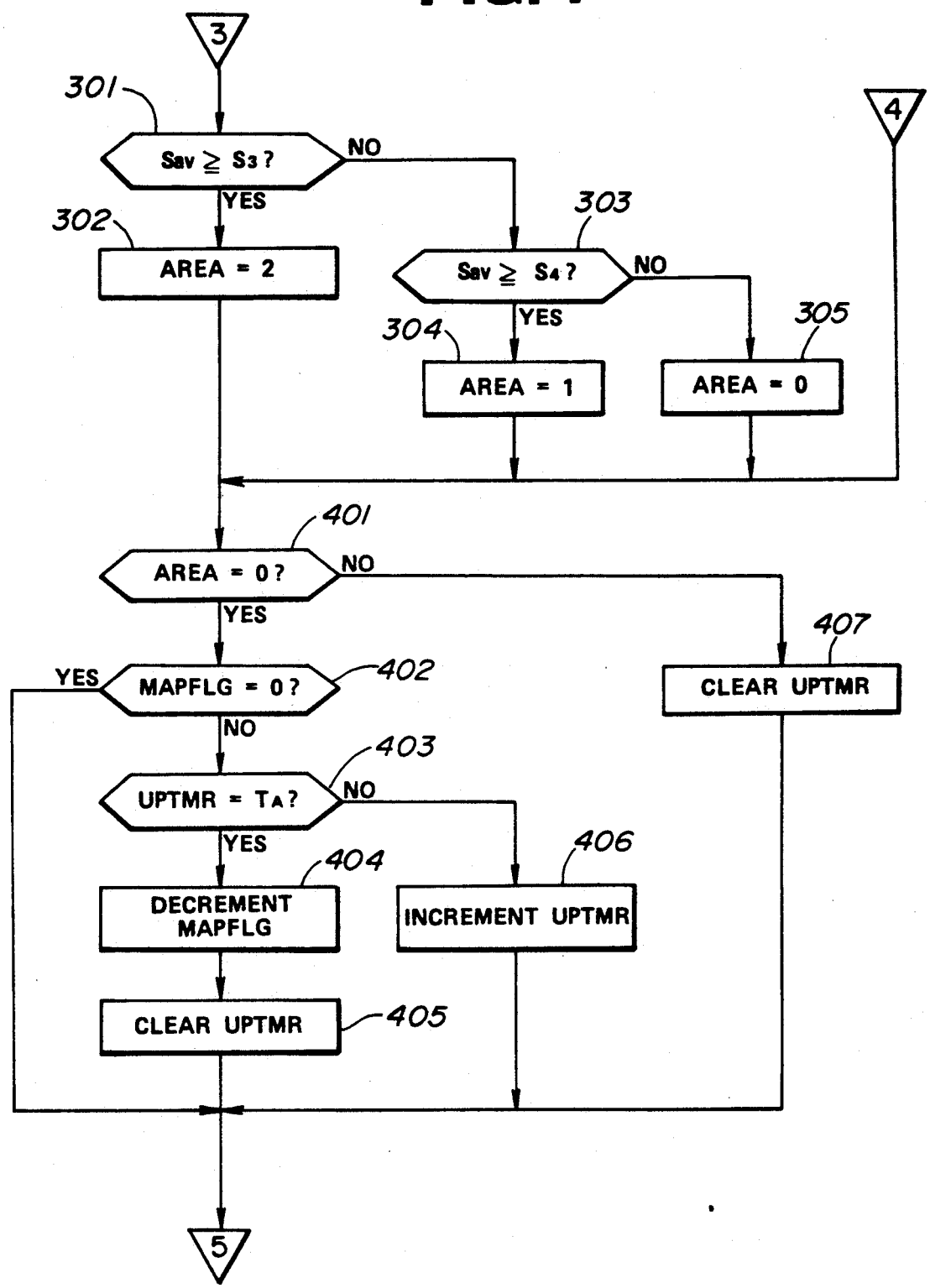
Figure 5:
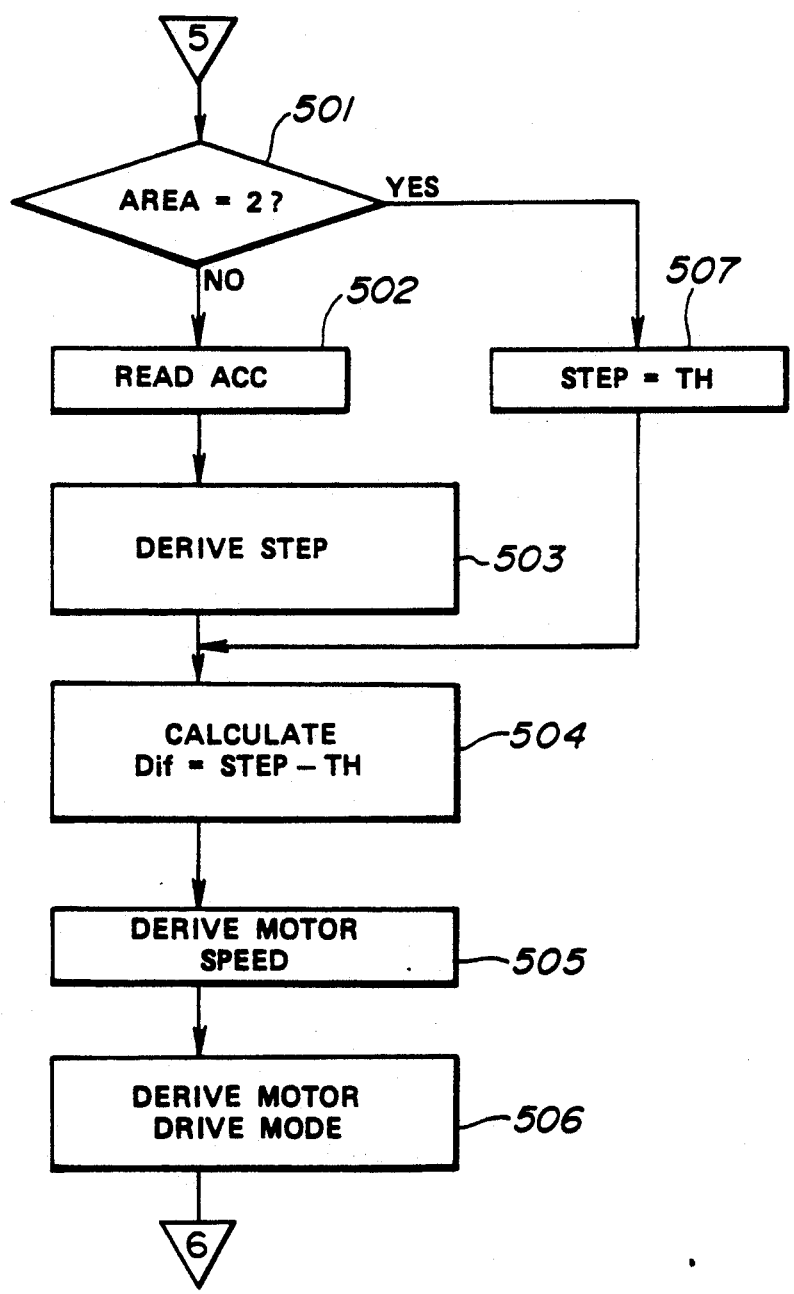
Figure 6:
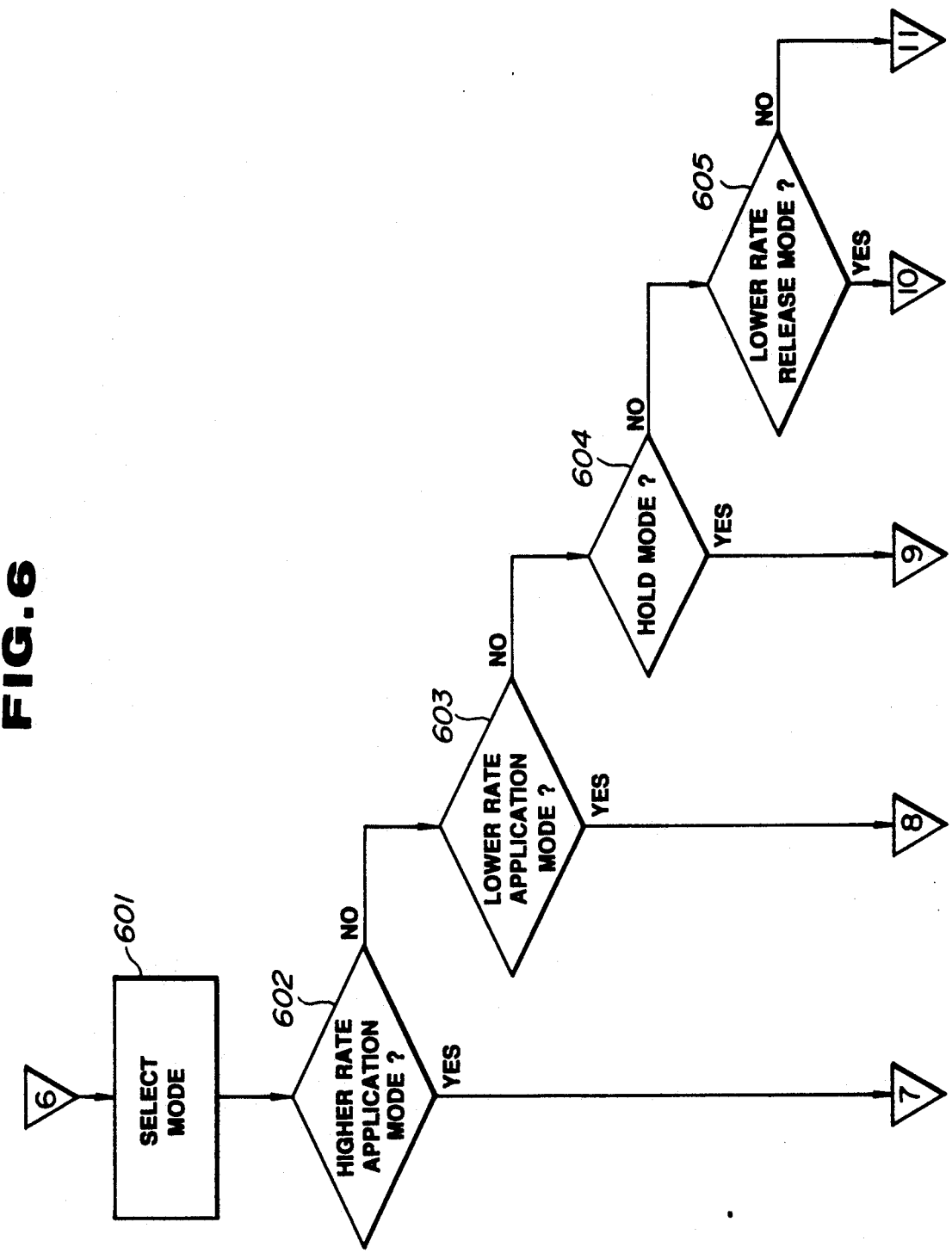
Figure 7:
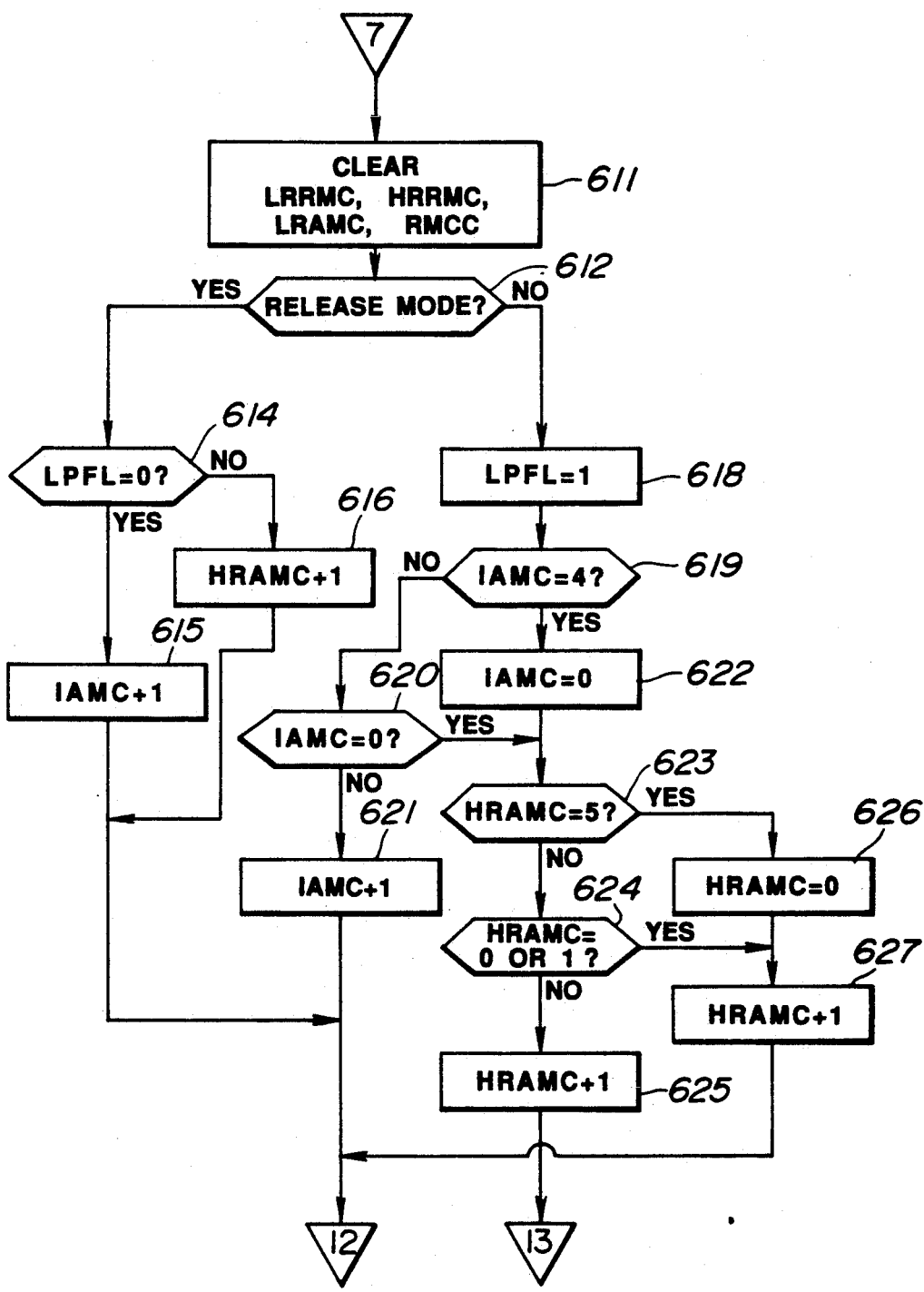

After one of the step 212, 211 and 216 or when the answer at the step 208 is negative, the process goes to a step 401 (FIG. 4). This process will be discussed later.

As set forth, when the weighted mean $S_{av}$ is a negative value as checked at the step 108 (FIG. 2), process directly jumps to a step 301. At the step 301, weighted mean $S_{av}$ is compared with a third wheel slippage criterion $S_3$ which is set at a greater value, e.g. 0.20, than the second wheel slippage criterion $S_2$ as seen from FIG. 13. If the weighted mean $S_{av}$ as checked at the step 301 is greater than or equal to the third wheel slippage criterion $S_3$, the wheel slippage area indicative data AREA is set at two (2) at a step 302. On the other hand, when the weighted mean $S_{av}$ is smaller than the third wheel slippage criterion $S_3$, the weighted mean $S_{av}$ is then compared with a fourth wheel slippage criterion $S_4$ which is set at a value, e.g. 0.12, greater than the first wheel slippage criterion $S_1$ but smaller than the second wheel slippage criterion $S_2$, at a step 303. When the weighted mean $S_{av}$ is greater than or equal to the fourth wheel slippage criterion $S_4$, the wheel slippage area indicative data AREA is set at a value one (1), at a step 305.

After one of the steps 302, 304, 305 and 212, 211, 16, the step 401 is processed. At the step 401, the wheel slippage area indicative data AREA is checked whether the data value is zero (0). As will be appreciated, the wheel slippage area indicative data AREA is set to zero when the weighted mean variation magnitude $\dot{S}_{av}$ is greater than or equal to zero and the weighted mean $S_{av}$ is smaller than or equal to the first wheel slippage criterion $S_1$; or when the weighted mean variation magnitude $\dot{S}_{av}$ is smaller than zero and the weighted mean $S_{av}$ is smaller than the fourth wheel slippage criterion $S_4$.

If the answer at the step 401 is positive, then the throttle valve open angle characteristics indicative value MAPFLG is checked to determine whether the value is zero which represents normal space throttle valve open angle variation characteristics, at a step 402. When the throttle valve open angle characteristics indicative value MAPFLG is greater than zero (0) as checked at the step 402, a timer value UPTMR of a timer which is designed for measuring an interval of variation of the throttle valve open angle characteristics indicative value MAPFLG to reduce the value for rising the maximum step number STEP (%), and will be hereafter referred to as "MAP-UP timer", is compared with a predetermined set timer value $T_A$. In practice, the set timer value $T_A$ which corresponding to interval of updating the throttle valve open angle characteristics indicative value MAPFLG, is set in a range of 100 msec to 200 msec. When the MAP-UP timer value UPTMR is equal to or greater than the set timer value $T_A$, then the throttle valve open angle characteristics indicative value MAPFLG is decremented by one (1), at a step 404. Thereafter, the MAP-UP timer value UPTMR is cleared at a step 405. On the other hand, when the MAP-UP timer value UPTMR is smaller than the set timer value $T_A$ as checked at the step 403, the MAP-UP timer value UPTMR is incremented by one (1) at a step 406. When the wheel slippage area indicative data AREA is not zero as checked at the step 401, the MAP-UP timer value UPTMR is cleared at a step 407.

Figure 9:
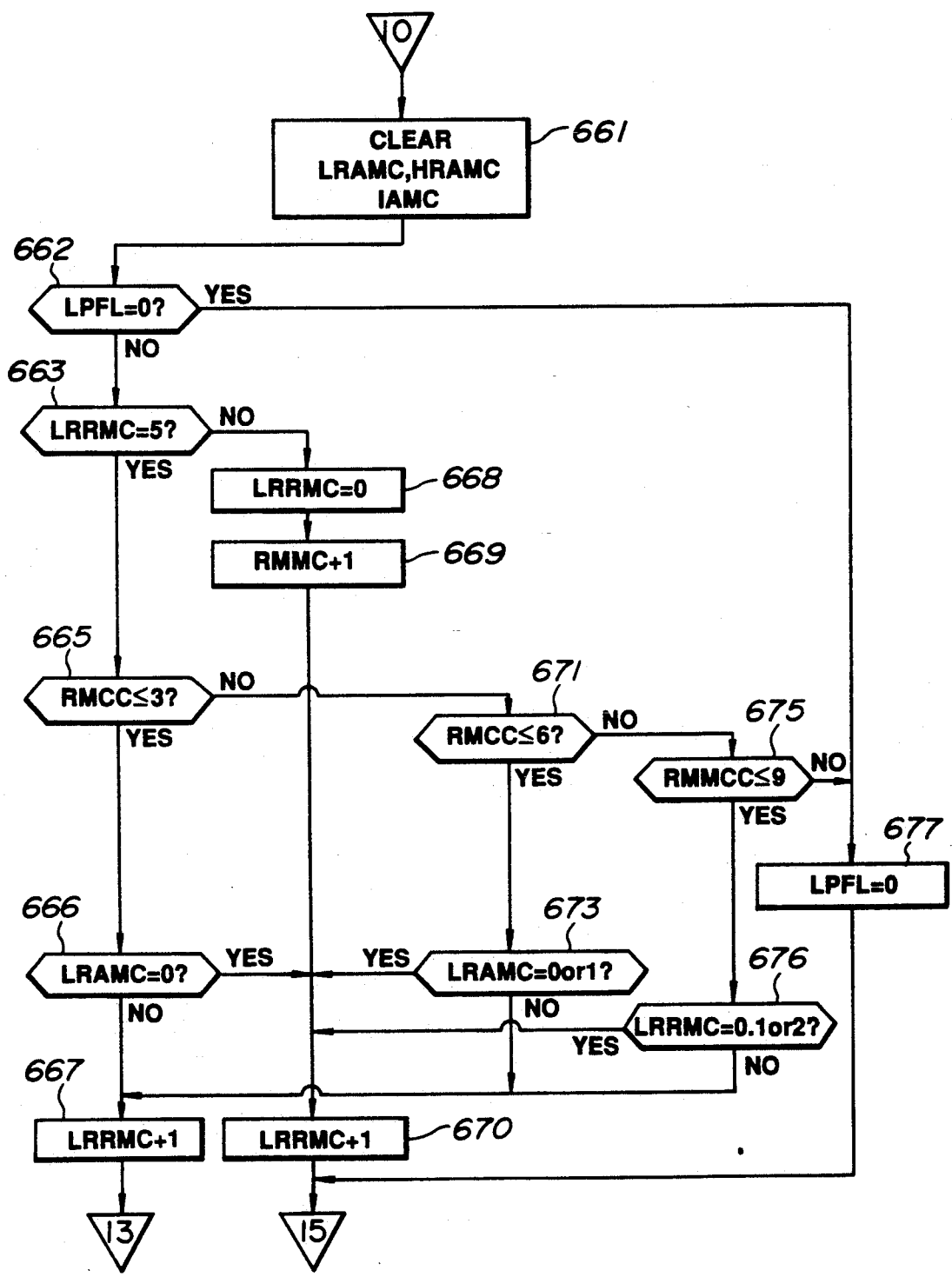

After one of the step 405, 406 and 407 or when the throttle valve open angle characteristics indicative value MAPFLG as checked at the step 402 is zero, process goes to a step 501. At the step 501, the wheel slippage area indicative data AREA is checked to determine whether the data value is two (2). The wheel slippage area indicative data AREA is set at two (2) when the weighted mean variation magnitude $\dot{S}_{av}$ is greater than or equal to zero and the weighted mean $S_{av}$ is greater than the second wheel slippage criterion $S_2$; or when the weighted mean variation magnitude $\dot{S}_{av}$ is smaller than zero and the weighted mean $S_{av}$ is greater than the third wheel slippage threshold $S_3$, as shown in FIG. 9. This means that the wheel slippage occurring on the wheel is substantial level. Therefore, if the wheel slippage area indicative data AREA is two as checked at the step 501, the step number STEP is set at a predetermined traction control set value $TH_A$ which corresponds to a predetermined throttle open angle, e.g. 5%, irrespective of the throttle valve open angle characteristics indicative value MAPFLG. On the other hand, if the wheel slippage area indicative data AREA is not two, it means that the magnitude of wheel slippage is not seriously great. Therefore, in such case, derivation of the step number STEP for driving the stepping motor 44 can be derived in relation to the accelerator position ACC in terms of the desired throttle valve open angle characteristics defined by the throttle valve open angle characteristics indicative value MAPFLG. Therefore, when the answer at the step 501 is negative, the accelerator position data ACC which is derived through A/D conversion of the accelerator position indicative analog signal of the accelerator sensor 9 performed by the A/D converter 11, is read at a step 502. Based on the accelerator position data ACC read at the step 502, map look-up is performed for deriving a target step number STEP according to the throttle valve open angle characteristics indicative value MAPFLG at a step 503.

Based on the target step number STEP corresponding to the target throttle valve angular position, derived at the step 507 or 503, a difference Dif is determined between the target step number STEP and the actual throttle valve angular position TH monitored by the throttle angle sensor 8, at a step 504. Based on the difference Dif derived at the step 504, the stepping motor driving speed and driving direction are determined at steps 505 and 506. At the steps 505 and 506, the frequency of OCI (output compare interrupt) is set and the motor driving direction indicative flag is set.

Subsequently brake control is performed through the process in the steps 601 through 693, operation in each step will be discussed herebelow. Though the following discussion for brake control process will be given in terms of the brake system for left driving wheel 2L, it should be appreciated that the same or equivalent control process may be done for the brake system of the right driving wheel 2R so as to optimize braking effect for the associated wheel for minimizing period required recovery of satisfactory wheel traction.

At a step 601, a brake control mode is selected from a preset mode selector table in terms of the wheel slippage $S_L$ and wheel slippage variation magnitude $\dot{S}_L$. The mode selector table is shown in FIG. 14. As can be seen from FIG. 14, the brake is operated in five mutually different modes. Basically, the traction control valve 24L operates in three different modes, i.e. APPLICATION mode for increasing the braking pressure in the wheel cylinder 23L, RELEASE mode for decreasing the braking pressure in the wheel cylinder and HOLD mode for holding the pressure in the wheel cylinder constant. The shown embodiment is additionally provided a LOWER RATE APPLICATION mode in which the traction control valve is periodically switched between the APPLICATION mode and HOLD mode and a LOWER RATE RELEASE mode in which the traction control valve is periodically switched between the RELEASE mode and the HOLD mode. In the LOWER RATE APPLICATION mode, the braking pressure in the wheel cylinder is increased in a stepwise fashion by periodically performing HOLD mode operation. Similarly, in the LOWER RATE RELEASE mode, the braking pressure in the wheel cylinder is decreased in a step fashion by periodically performing the HOLD mode operation. In order to give clear distinction from the aforementioned LOWER RATE APPLICATION mode and LOWER RATE RELEASE mode, the usual APPLICATION mode to linearly increase the braking pressure will be hereafter referred to as "HIGHER RATE APPLICATION mode" and the usual RELEASE mode for linearly decreasing the braking pressure will be hereafter referred to as "HIGHER RATE RELEASE mode".

At at step 602, a check is performed as to whether the selected to mode is the HIGHER RATE APPLICATION mode or not. If the HIGHER RATE APPLICATION mode is selected, a HIGHER RATE APPLICATION mode control branch through steps 611 through 627 which will be discussed later, is executed subsequently to the positive judgement at the step 602. If the answer at the step 602 is negative, process goes to a step 603 in which a check is as to performed whether the selected mode is the LOWER RATE APPLICATION mode. If the selected mode is the LOWER RATE APPLICATION mode and thus the answer at the step 603 is positive, the LOWER RATE APPLICATION mode control branch is executed through steps 631 to 651 which will also be discussed later. On the other hand, when the answer at the step 603 is negative, the process goes to a step 604. At the step 604, a check is performed as to whether the selected mode is HOLD. If the selected mode is HOLD mode, the HOLD mode control branch of a step 655 is executed. When the answer at the step 604 is negative, the processor does to a step 605 in which a check is performed as to whether the selected mode is the LOWER RATE RELEASE mode. If yes, process through a LOWER RATE RELEASE mode control branch of steps 661 through 685 which will be discussed later, is executed. On the other hand, when the selected mode as checked at the step 605 is not the LOWER RATE RELEASE and thus the answer at the step 605 is negative, judgement can be made that the selected mode is the HIGHER RATE RELEASE mode. Then, process of steps 681 through 685 which are common to the LOWER RATE RELEASE, is executed.

When the HIGHER RATE APPLICATION mode is selected, the HIGHER RATE APPLICATION mode control branch is initiated from the step 611. At a step 611, a counter which is cyclically or periodically incremented during the LOWER RATE RELEASE mode, which counter will be hereafter referred to as "LOWER RATE RELEASE mode counter LRRMC", a counter which is cyclically or periodically incremented during the HIGHER RATE RELEASE mode, which counter will be hereafter referred to as "HIGHER RATE RELEASE mode counter HRRMC", a counter which is cyclically or periodically incremented during the LOWER RATE APPLICATION mode, which will be hereafter referred to as "LOWER RATE APPLICATION mode counter LRAMC" and a counter incremented during the LOWER RATE RELEASE mode or representing RELEASE mode period, which will be hereafter referred to as "RELEASE mode control counter RMCC" are cleared. Thereafter, at a step 612, the mode selected in the immediate preceding execution cycle is checked. When the mode selected in the immediately preceding execution cycle is the HIGHER RATE or LOWER RATE RELEASE as checked at the step 612, a flag representative of demand for increasing the braking pressure, which flag will be hereafter referred to as "LOW pressure representative flag LPFL" is checked at a step 614. If the LOW pressure representative flag LPFL is not set as checked at the step 614, a counter which is incremented during initial stage APPLICATION mode and will be hereafter referred to as "initial APPLICATION mode counter IAMC", is incremented by one (1), at a step 615. On the other hand, when the LOW pressure representative flag LPFL as checked at the step 614 is not set, a counter which is incremented during the HIGHER RATE APPLICATION mode and will be hereafter referred to as the "HIGHER RATE APPLICATION mode counter", is incremented by one (1) at a step 616.

On the other hand, if the mode selected in the immediately preceding execution cycle is the HIGHER RATE or LOWER RATE APPLICATION mode or the HOLD mode as checked at the step 612, the LOW pressure representative flag LPFL is set at a step 618. Thus, at a step 619, the initial APPLICATION mode counter IAMC is checked as to whether the counter value is four (4). When the initial APPLICATION mode counter IAMC is not four (4) as checked at the step 619, the initial APPLICATION mode counter IAMC is again checked at a step 620 as to whether the initial APPLICATION mode counter IAMC is zero (0) at a step 620. If the answer at the step 620 is negative, the initial APPLICATION mode counter IAMC is incremented by one (1) at a step 621. On the other hand, when the initial APPLICATION mode counter IAMC is four (4) as checked at the step 619, the initial APPLICATION mode counter IAMC is set at zero (0) at a step 622.

When the initial APPLICATION mode counter IAMC as checked at the step 620 is zero and thus the answer at the step 620 is negative, or after the step 622, the HIGHER RATE APPLICATION mode counter HRAMC is checked as to whether the counter value thereof is five (5) at a step 623. When the HIGHER RATE APPLICATION mode counter HRAMC as checked at the step 623, the HIGHER RATE APPLICATION mode counter HRAMC is checked as to whether the counter value is one (1) or zero (0) at a step 624. If the HIGHER RATE APPLICATION mode counter HRAMC as checked at the step 624 is not one (1) or zero (0), the HIGHER RATE APPLICATION mode is incremented by one (1) at a step 625. On the other hand, when the HIGHER RATE APPLICATION mode counter HRAMC as checked at the step 624 is one (1) or zero (0) or after the step 626, the HIGHER RATE APPLICATION mode counter HRAMC is incremented by one (1) at a step 627.

After one of the steps 615, 616, 621 and 627, process goes to a step 691 in which a control signal ordering the pressure increasing value position (C) is output. On the other hand, after the step 625, process goes to a step 692 in which the pressure control signal ordering the pressure holding valve position is output.

When the LOWER RATE APPLICATION mode is selected, the the LOWER RATE APPLICATION mode control branch is initiated from the step 631. At a step 631, the LOWER RATE RELEASE the RELEASE mode control counter RMCC are cleared. Thereafter, at a step 632, the mode selected in the immediate preceding execution cycle is checked. When the mode selected in the immediately preceding execution cycle is HIGHER RATE or LOWER RATE RELEASE as checked at the step 632, the LOW pressure representative flag LPFL is checked at a step 634. If the LOW pressure representative flag LPFL is not set as checked at the step 634, the initial APPLICATION mode counter IAMC is incremented by one (1), at a step 635. On the other hand, when the LOW pressure representative flag LPFL as checked at the step 634 is set, the HIGHER RATE APPLICATION mode counter is incremented by one (1) at a step 636.

On the other hand, if the mode selected in the immediately preceding execution cycle is HIGHER RATE or LOWER RATE APPLICATION mode or HOLD mode as checked at the step 632, the LOW pressure representative flag LPFL is set at a step 638. Then, at a step 639, the initial APPLICATION mode counter IAMC is checked as to whether the counter value is four (4). When the initial APPLICATION mode counter IAMC is not four (4) as checked at the step 639, the initial APPLICATION mode counter IAMC is again checked at a step 640 as to whether the initial APPLICATION mode counter IAMC is zero (0) at a step 640. If the answer at the step 640 is negative, the initial APPLICATION mode counter IAMC is incremented by one (1) at a step 641. On the other hand, when the initial APPLICATION mode counter IAMC is four (4) as checked at the step 639, the initial APPLICATION mode counter IAMC is set at zero (0) at a step 642.

When the initial APPLICATION mode counter IAMC as checked at the step 640 is zero (0) and thus the answer at the step 640 is negative, or after the step 642, the HIGHER RATE APPLICATION mode counter HRAMC is checked as to whether the counter value thereof is five (5) at a step 643. When the HIGHER RATE APPLICATION mode counter HRAMC as checked at the step 643 is five (5), the HIGHER RATE APPLICATION mode counter HRAMC is set to zero (0) at a step 644. Thereafter, the LOWER RATE APPLICATION mode counter LRAMC is checked as to whether the counter value is five (5) or not at a step 645. If the LOWER RATE APPLICATION mode counter LRAMC is not five (5), then the LOWER RATE APPLICATION mode counter LRAMC is checked whether the counter value is zero (0) at a step 646. If the LOWER RATE APPLICATION mode counter LRAMC as checked at the step 644 is not zero (0), the LOWER RATE APPLICATION mode is incremented by one (1) at a step 647. On the other hand, when the LOWER RATE APPLICATION mode counter LRAMC is five (5) as checked at the step 645, then the LOWER RATE APPLICATION mode counter LRAMC is set at zero (0), at a step 650. After setting the LOWER RATE APPLICATION mode counter LRAMC to zero (0) or when the LOWER RATE APPLICATION mode counter LRAMC as checked at the step 645 is zero (0), the HIGHER RATE APPLICATION mode counter HRAMC is incremented by one (1) at a step 651. On the other hand, when the HIGHER RATE APPLICATION mode counter HRAMC as checked at the step 643 is not five (5), the HIGHER RATE APPLICATION mode counter value is checked as to whether the counter value HRAMC is zero (0) at a step 648. When, the HIGHER RATE APPLICATION mode counter value HRAMC is zero (0) as checked at the step 648, process goes to the foregoing step 645. Otherwise, the HIGHER RATE APPLICATION mode counter value HRAMC is incremented by one (1) at a step 649.

After one of the steps 635, 636, 641 and 651, process goes to the step 691 in which a control signal ordering the pressure increasing value position (C) is output. On the other hand, after the step 647 or 649, process goes to the step 692 in which the pressure control signal ordering the pressure holding valve position is output.

If the selected mode is the HOLD mode and thus the answer at the step 604 is positive, the initial APPLICATION mode counter IAMC, the HIGHER RATE APPLICATION mode counter HRAMC and the LOWER RATE APPLICATION mode counter LRAMC are cleared at the step 655. Thereafter, process goes to the step 692.

When the selected mode is LOWER RATE RELEASE mode and thus the answer at the step 605 is positive, then the initial APPLICATION mode counter IAMC, the HIGHER RATE APPLICATION mode counter HRAMC and the LOWER RATE APPLICATION mode counter LRAMC are cleared at the step 661. Then, the LOW pressure representative flag LPFL is checked as to whether the flag is reset at a step 662. If the LOW pressure representative flag LPFL is set as checked at the step 662 and thus the answer at the step 662 is negative, the LOWER RATE RELEASE mode counter LRRMC is checked as to whether the counter value is five (5), at a step 663. When the LOWER RATE RELEASE mode counter value LRRMC as checked at the step 663 is not five (5), then the RELEASE mode control counter RMCC is checked as to whether the counter value is smaller than or equal to three (3), at a step 665. Then, the RELEASE mode control counter value RMCC is smaller than or equal to three (3) as checked at the step 665 and thus the answer at the step 665 is positive, then the LOWER RATE RELEASE mode counter LRRMC is checked as to whether the counter value is zero (0), at a step 666. When the LOWER RATE RELEASE mode counter value LRRMC is not zero (0) as checked at the step 666, then the LOWER RATE RELEASE mode counter value LRRMC is incremented by one (1) at a step 667.

On the other hand, when the LOWER RATE RELEASE mode counter value LRRMC as checked at the step 663 is five (5), the LOWER RATE RELEASE mode counter value LRRMC is cleared to zero (0) at a step 668. Then, the RELEASE mode control counter RMCC is incremented by one (1) at a step 669. After the process at the step 669 or when the LOWER RATE RELEASE mode counter LRRMC is zero (0) as checked at the step 666, the process goes to a step 670, in which the LOWER RATE RELEASE mode counter value LRRMC is incremented by one (1).

When the RELEASE mode control counter RMCC as checked at the step 665 is greater than three (3) and thus the answer at the step 665 is negative, then, the RELEASE mode control counter value is again checked at a step 671 as to whether the counter value RMCC is smaller than or equal to six (6). When the RELEASE mode control counter value RMCC is smaller than or equal to six (6) as checked at the step 671, then the LOWER RATE RELEASE mode counter value LRRMC is checked as to whether the counter value is zero (0) or one (1) at a step 673. If the LOWER RATE RELEASE mode counter value LRRMC as checked at the step 673 is zero (0) or one (1), then process goes to the foregoing step 670. On the other hand, if the LOWER RATE RELEASE mode counter value LRRMC is not zero (0) or one (1) as checked at the step 673, the process goes to the foregoing step 667.

When the RELEASE mode control counter value RMCC is greater than six (6) as checked at the step 671, the RELEASE mode control counter value RMCC is checked as to whether the counter value is smaller than or equal to nine (9) at a step 675. If the RELEASE mode control counter value RMCC is smaller than or equal to nine (9) as checked at the step 675, then the LOWER RATE RELEASE mode counter value LRRMC is checked at a step 676 as to whether the counter value is zero (0) or one (1). If the LOWER RATE RELEASE mode counter value LRRMC is zero (0) or one (1) as checked at the step 676, the process goes to the step 670 and otherwise goes to the step 667.

If the LOW pressure representative flag LPFL is not set as checked at the step 662 or when the RELEASE mode control counter value RMCC as checked at the step 675 is greater than nine (9) and thus the answer at the step 675 is negative, process goes to a step 677, in which the LOW pressure representative flag LPFL is reset at a step 677.

After the step 667, process goes to the step 692. On the other hand, after the step 670 or 677, process goes to a step 693, in which the control signal ordering the normal valve position (A) of the traction control valve 40L is output.

On the other hand, when all answers through the steps 602, 603, 604 and 605 are negative and thus judgement is made that the selected mode is HIGHER RATE RELEASE mode, the initial APPLICATION mode counter IAMC, the HIGHER RATE APPLICATION mode counter HRAMC and the LOWER RATE APPLICATION mode counter LRAMC are cleared at a step 681. Then, at a step 682, the LOW pressure representative flag LPFL is checked. When the LOW pressure representative flag LPFL is not set as checked at the step 682, the HIGHER RATE RELEASE mode counter value HRRMC is checked as to whether the counter value is greater than or equal to ten (10) at a step 683. When the LOWER RATE RELEASE mode counter value LRRMC is smaller than ten (10) as checked at the step 683, then, the LOWER RATE RELEASE mode counter value LRRMC is incremented by one (1) at a step 684. On the other hand, when the LOWER RATE RELEASE mode counter value LRRMC is greater than or equal to ten (10) as checked at the step 683, then the LOW pressure representative flag LPFL is reset at a step 685. After the process at one of the step 684 and 685 or when the LOW pressure representative flag LPFL as checked at the 682 is set, process goes to step 693.

Subsequently to one of the steps 691, 692 and 693 for selecting the position of the left traction control valve 40L, the one of the HIGHER RATE APPLICATION mode, LOWER RATE APPLICATION mode, HOLD mode, HIGHER RATE RELEASE mode and LOWER RATE RELEASE mode is selected for the right traction control valve 40R is selected on the basis of the wheel slippage $S_R$ at the right driving wheel 2R and the variation magnitude $\dot{S}_R$ thereof at a step 695. Then, at a step 696, brake control process which is the same as that performed through the steps 602 to 693 is performed. Because the process and operation of respective steps are identical to that discussed above, the detailed discussion is neglected for simplification of disclosure to facilitate clear understanding of the invention and for avoiding unnecessary confusion.

After the process in the step 696, the input level from the pressure switch 47 is checked at a step 701. When the input level from the pressure switch 47 remains at a LOW level to represent sufficient pressure accumulated in the pressure accumulator 43, a LOW level pump drive control signal is output at a step 703 to maintain the motor in an 44 inoperative state. On the other hand, when the input level from the pressure switch 47 is HIGH to indicate that the pressure accumulated in the pressure accumulator 43 drops below an acceptable level, then, at a step 702, a high level pump control signal is output to drive the motor 44 and whereby drive the pump to generate the fluid pressure to be accumulated in the pressure accumulator 43.

Figure 8:
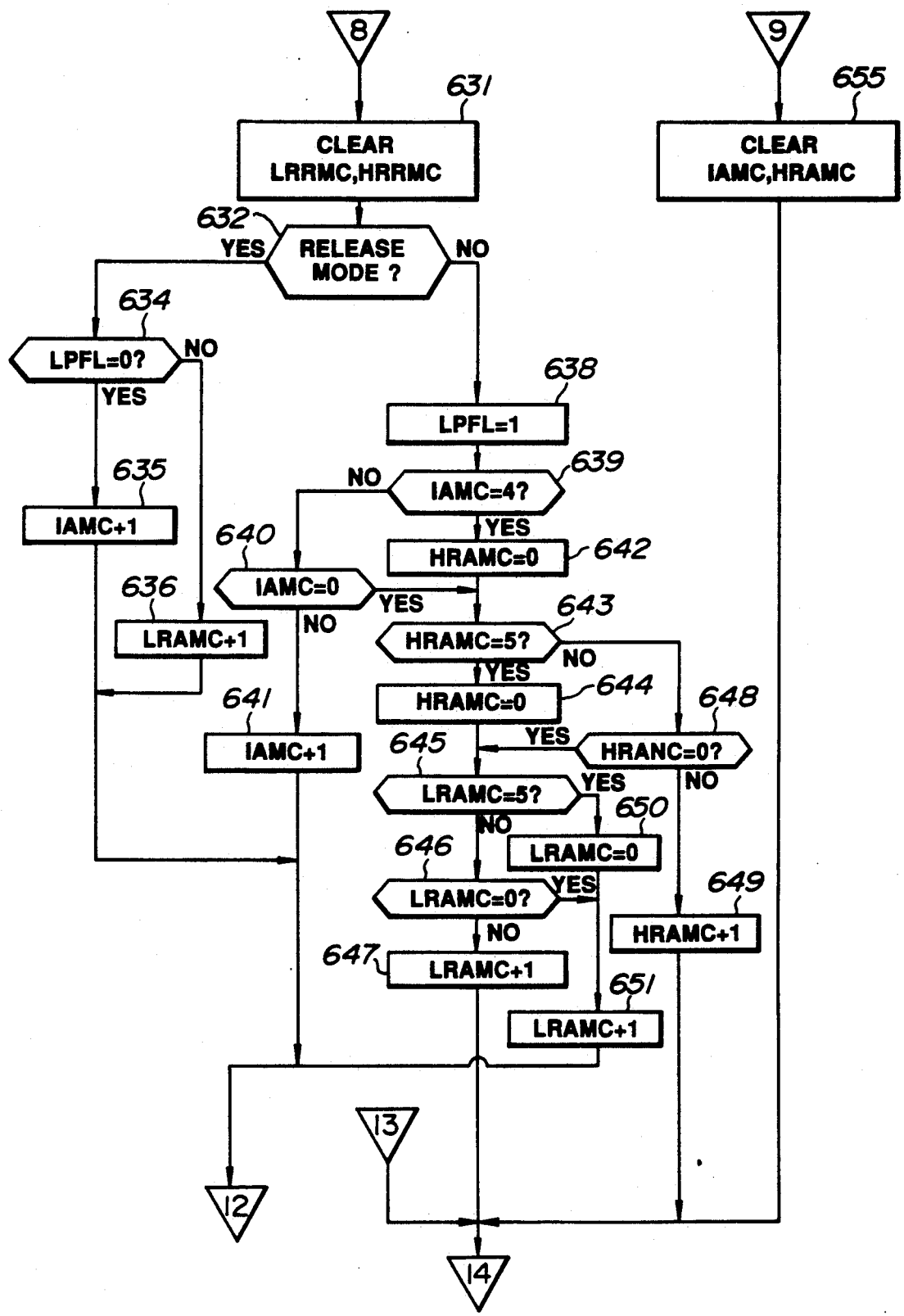

FIG. 8 shows the OCI routine for controlling throttle valve angular position. The shown routine is designed to be executed at a frequency for achieving the motor speed derived at the step 505. In other words, the frequency of OCI routine is variable depending upon the desired motor speed derived at the step 505. Immediately after starting execution, the motor driving mode is checked at a step 800. Namely, the stepping motor 5 is driven in three different modes, i.e. FORWARD mode in which the stepping motor is incrementingly driven in forward direction, REVERSE mode, in which the stepping motor is decrementingly driven in reverse direction and HOLD mode, in which the stepping motor is held at the present position.

The motor driving mode can be discriminated from the result of the step 506. Therefore, in the step 800, motor driving direction indicative flag set in the step 506 is checked. When the driving mode is FORWARD mode, the motor drive control signal is set for driving the stepping motor 4 for one step, at a step 801. Similarly, when the driving mode is REVERSE mode, the motor drive control signal is set for drive the stepping motor in reverse direction for one step, at a step 802. After one of the step 801 and 802 or when the motor driving mode is the HOLD mode, process goes to a step 803, in which the motor drive control signal is fed to the motor drive circuit 13 for driving the motor for controlling motor operation according to the set motor drive control signal. Namely, when the one step of forward driving is set at the step 801, the motor drive circuit 13 output electric power for steppingly drive the stepping motor for one step in the forward direction for causing increasing of the throttle valve open angle at the corresponding magnitude. On the other hand, when the one step of reverse driving is set at the step 802, the motor drive circuit outputs electric power for steppingly drive the stepping motor for one step in the reverse direction for causing decreasing of the throttle valve open angle in the corresponding magnitude. Furthermore, when the motor drive mode is HOLD mode, then no electric power is supplied and thus the throttle valve is maintained at the present angular position.

The operation of the foregoing preferred embodiment of the traction control system will be discussed herebelow with reference to charts in FIGS. 17 through 21.

Figure 17A:
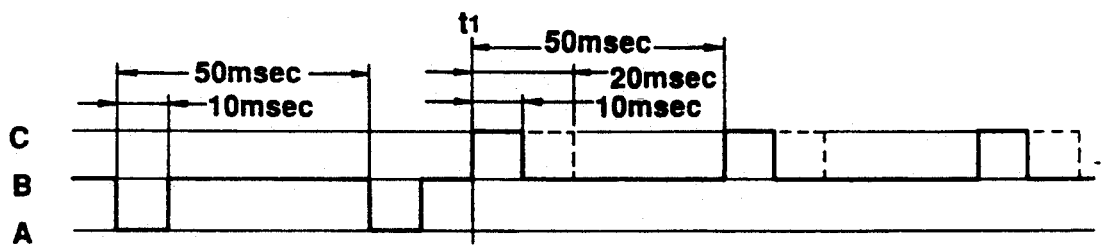
FIGS. 17(a)–17(b), 18(a)–18(d) and 19(a)–19(b) are charts showing brake control operation in various modes.

As seen from FIG. 17(a), it is assumed that the mode is switched from the RELEASE mode to the APPLICATION mode when the LOW pressure representative flag LPFL is set at a time $t_1$, and is further assumed that the RELEASE mode operation is performed in the LOWER RATE RELEASE mode for decreasing the braking pressure with the pressure control signal with a one-fifth duty cycle, in which a period for placing the traction control valve 40L at the normal valve position (A) is 10 msec in a period of the pulse of the pressure control signal. Therefore, until the time $t_1$, the braking pressure in the wheel cylinder 23L is decreased by controlling the traction control valve 40L with one-fifth duty cycle pressure control signal. When the wheel slippage $S_L$ and the wheel slippage variation magnitude $\dot{S}_L$ varies a criterion between the LOWER RATE RELEASE mode area and the APPLICATION mode area, then the HIGHER RATE APPLICATION mode is selected at the step 601. Therefore, the answer at the step 602 becomes positive. This triggers the HIGHER RATE APPLICATION mode control branch. Immediately after switching the mode from the LOWER RATE APPLICATION mode to the HIGHER RATE APPLICATION mode, the result in checking of the mode in the immediately preceding execution cycle shows that the previous mode is the LOWER RATE RELEASE mode, therefore process goes to the step 614. At this time, since the LOW pressure representative flag LPFL is set, the answer at the step 614 becomes negative. Therefore, at the step 616, the HIGHER RATE APPLICATION mode counter HRAMC is incremented. Thereafter, process goes to the step 691 for ordering the APPLICATION mode for operating the traction control valve 40L at the pressure increasing valve position (C)

In the subsequent cycle, since the preceding mode is the HIGHER RATE APPLICATION mode, the process goes to the step 618 after the step 612. Since the LOW pressure representative flag LPFL is set as checked at the step 618, process goes to the step 620. At this time, since the initial APPLICATION mode counter IAMC is maintained zero (0), a check is performed as to whether the HIGH RATE APPLICATION mode counter value is five (5). At this time, since the HIGH RATE APPLICATION mode counter value is one (1), the answer at the step 623 becomes negative. As set forth, since the HIGH RATE APPLICATION mode counter value is one (1), the answer at the step 624 becomes positive. The HIGH RATE APPLICATION mode counter HRAMC is then incremented by one (1) at the step 627. Thereafter, the pressure control signal ordering the APPLICATION mode for operating the traction control valve 40L at the pressure increasing valve position (C) is output at the step 691.

Figure 18A:
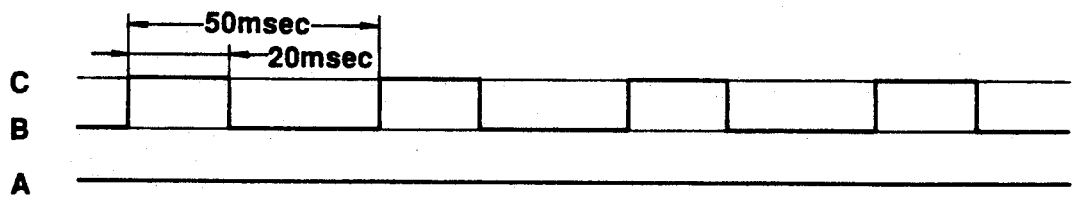
Figure 18B:
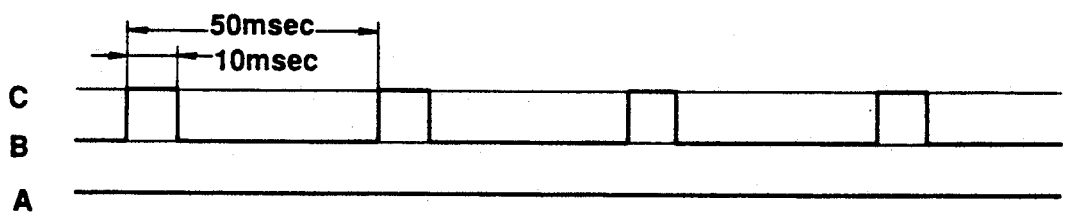

In the next cycle, since the HIGH RATE APPLICATION mode counter value HRAMC is two (2), the answer at the step 624 becomes negative. Then, the HIGH RATE APPLICATION mode counter value HRAMC is incremented by one (1) at the step 625. Then, process goes to the step 692 to output the pressure control signal ordering the HOLD mode for operating the traction control valve 40L at the pressure holding valve position (B). This loop of the steps 612, 618, 619, 620, 623, 624, 625 and 692 repeated subsequent two execution cycles for maintaining the HOLD mode. Namely, the HOLD mode is maintained for three execution cycles until the HIGH RATE APPLICATION mode counter value HRAMC reaches five (5). By repeating this, the braking pressure in the wheel cylinder 23L can be increased at a duty cycle of two-fifth as shown in FIG. 18(a)

Figure 17B:
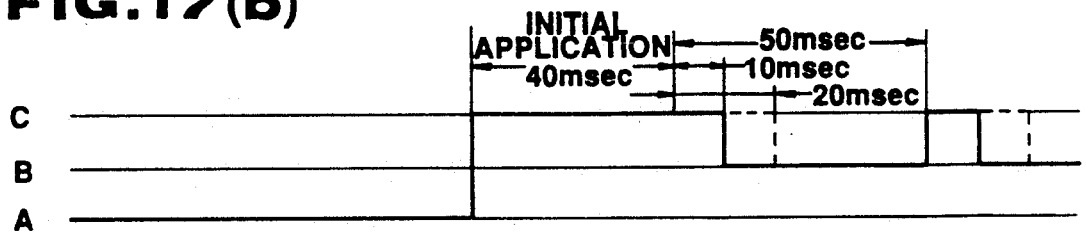

On the other hand, when the mode is switched from the RELEASE mode to the APPLICATION mode while the LOW pressure representative flag LPFL is reset at a time $t_1$ of FIG. 17(b), the RELEASE mode is performed with 100% duty cycle before the time $t_1$ because the LOW pressure representative flag LPFL is reset. At the time $t_1$, the mode selection in the step 601 is switched from the HIGH RATE RELEASE mode to the HIGH RATE APPLICATION mode. Therefore, the HIGH RATE APPLICATION mode control branch is triggered. At the first execution cycle, the preceding mode as checked at the step 612 is the HIGH RATE RELEASE mode. Therefore, process goes to the step 614. At this time, since the LOW pressure representative flag LPFL is not set, the initial APPLICATION mode counter IAMC is incremented by one (1) at the step 615. Then, the APPLICATION mode ordering pressure control signal is output for operating the traction control valve 40L at the pressure increasing mode is output at the step 691. In the subsequent cycle, since the preceding cycle is APPLICATION mode, the LOW pressure representative flag LPFL is set at the step 618. Then, since the initial APPLICATION mode counter IAMC is one (1), the answer at the step 619 becomes negative and the answer at the step 620 also becomes negative, therefore, the initial APPLICATION mode counter value IAMC is incremented by one (1) at the step 621. Subsequently, the pressure control signal for operating the traction control valve 40L at the pressure increasing valve position (C) is output at the step 691. The steps 612, 618, 619, 620, 621 and 691 is repeated until the initial APPLICATION mode counter value IAMC becomes four (4). Therefore, in the initial stage of APPLICATION mode, braking pressure in the wheel cylinder is increased with 100% duty cycle.

When the initial APPLICATION mode counter value IAMC reaches four (4), then the answer at the step 619 becomes positive. Therefore, process goes to the step 622 to clear the initial APPLICATION mode counter value IAMC to zero (0). Subsequently, the process for increasing the braking pressure with two-fifth duty cycle as discussed with respect to FIG. 17(a) is performed.

In the LOW RATE APPLICATION mode operation, assuming that the result in checking of the mode in the immediately preceding execution cycle shows that the previous mode is the LOWER RATE APPLICATION mode which is the same mode as selected in the current execution cycle, the process goes to the step 638 after the step 632. Since the LOW pressure representative flag LPFL is set as checked at the step 638, process goes to the step 640. At this time, since the initial APPLICATION mode counter IAMC is maintained zero (0), a check is performed as to whether the HIGH RATE APPLICATION mode counter value is five (5) at the step 643. At this time, since the HIGH RATE APPLICATION mode counter value is one (0), the answer at the step 643 becomes negative. As set forth, since the HIGH RATE APPLICATION mode counter value is one (0), the answer at the step 648 becomes positive. Then, the LOW RATE APPLICATION mode counter value LRAMC is checked as to whether the counter value is five (5) at the step 645. As long as the LOW RATE APPLICATION mode counter value LRAMC is not five (5), the counter value LRAMC is incremented by one (1) at the step 647. Thereafter, the pressure control signal ordering the HOLD mode for operating the traction control valve 40L at the pressure holding valve position (B) is output at the step 692. On the other hand, when the LOW RATE APPLICATION mode counter value LRAMC reaches five (5), the counter value is cleared to zero (0) at the step 650 and subsequently the LOW RATE APPLICATION mode counter value LRAMC is incremented by one (1) at the step 651. Then, the pressure control signal ordering the APPLICATION mode for operating the traction control valve 40L to the pressure increasing valve position (C) is output at the step 691.

Therefore, through the process set forth above, in the LOW RATE APPLICATION mode operation, the braking pressure is increased at one-fifth of duty cycle.

Figure 19A:
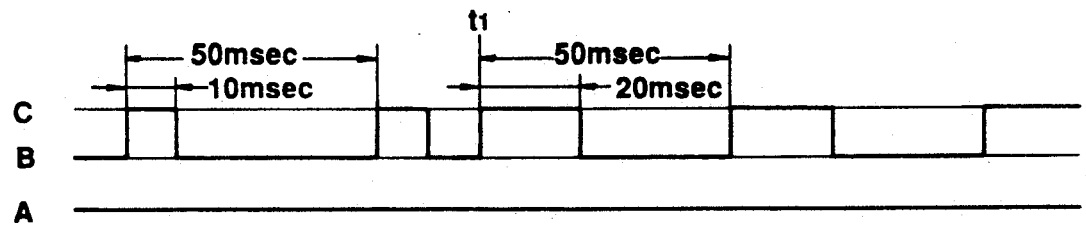
Figure 19B:
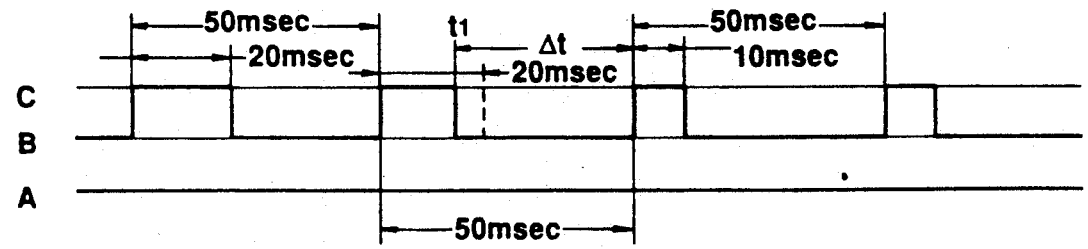

When the mode selection is switched from the LOW RATE APPLICATION mode to the HIGH RATE APPLICATION mode at a time $t_1$ as shown in FIG. 19(a), since the preceding mode is the LOWER RATE APPLICATION mode, the process goes to the step 618 after the step 612. Since the LOW pressure representative flag LPFL is set as checked at the step 618, process goes to the step 620. At this time, since the initial APPLICATION mode counter IAMC is maintained zero (0), a check is performed as to whether the HIGH RATE APPLICATION mode counter value is five (5). At this time, since the HIGH RATE APPLICATION mode counter value is one (1), the answer at the step 623 becomes negative. As set forth, since the HIGH RATE APPLICATION mode counter value is one (1), the answer at the step 624 becomes positive. The HIGH RATE APPLICATION mode counter HRAMC is then incremented by one (1) at the step 627. Thereafter, the pressure control signal ordering the APPLICATION mode for operating the traction control valve 40L at the pressure increasing valve position (C) is output at the step 691.

In the next cycle, since the HIGH RATE APPLICATION mode counter value HRAMC is two (2), the answer at the step 624 becomes negative. Then, the HIGH RATE APPLICATION mode counter value HRAMC is incremented by one (1) at the step 625. Then, process goes to the step 692 to output the pressure control signal ordering HOLD mode for operating the traction control valve 40L at the pressure holding valve position (B). This loop of the steps 612, 618, 619, 620, 623, 624, 625 and 692 repeated subsequent two execution cycles for maintaining the HOLD mode. Namely, the HOLD mode is maintained for three execution cycles until the HIGH RATE APPLICATION mode counter value HRAMC reaches five (5).

Therefore, as can be appreciated, in case that the mode is switched from the LOW RATE APPLICATION mode to the HIGH RATE APPLICATION mode, the HIGH RATE APPLICATION mode operation is performed for increating the duty cycle of braking pressure increasing cycle from one-fifth to two-fifth. On the other hand, when the mode is switched from the HIGH RATE APPLICATION mode to the LOW RATE APPLICATION mode, since the immediately preceding execution cycle shows that the previous mode is the HIGHER RATE APPLICATION mode, the process goes to the step 638 after the step 632. Since the LOW pressure representative flag LPFL is set as checked at the step 638, process goes to the step 640. At this time, since the initial APPLICATION mode counter IAMC is maintained zero (0), a check is performed as to whether the HIGH RATE APPLICATION mode counter value is five (5) at the step 643. At a occasion that the HIGH RATE APPLICATION mode counter value is one (0) or five (5), the answer at the step 643 becomes negative. As set forth, since the HIGH RATE APPLICATION mode counter value is one (0), the answer at the step 648 becomes positive. Then, the LOW RATE APPLICATION mode counter value LRAMC is checked as to whether the counter value is five (5) at the step 645. As long as the LOW RATE APPLICATION mode counter value LRAMC is not five (5), the counter value LRAMC is incremented by one (1) at the step 647. Thereafter, the pressure control signal ordering the HOLD mode for operating the traction control valve 40L at the pressure holding valve position (B) is output at the step 692. On the other hand, when the LOW RATE APPLICATION mode counter value LRAMC reaches five (5), the counter value is cleared to zero (0) at the step 650 and subsequently the LOW RATE APPLICATION mode counter value LRAMC is incremented by one (1) at the step 651. Then, the pressure control signal ordering the APPLICATION mode for operating the traction control valve 40L to the pressure increasing valve position (C) is output at the step 691. Therefore, in such case, the LOW RATE APPLICATION mode is performed immediately after switch the mode from the HIGH RATE APPLICATION mode to the LOW RATE APPLICATION mode.

On the other hand, when the HIGH RATE APPLICATION mode counter value as checked at the steps 643 and 648 is other than zero (0) or five (5), then, the HIGH RATE APPLICATION mode mode counter is incremented by one (1) at the step 649. Thereafter, process goes to the step 692 for operating the traction control valve 40L to the pressure holding position (B). This process through the steps 632, 638, 639, 640, 643, 648, 649 and 692 is repeated until the HIGH RATE APPLICATION mode counter value HRAMC reaches to five (5). Through this process, a lag time in switch mode from the HIGH RATE APPLICATION mode to the LOW RATE APPLICATION mode can be provided.

Figure 18C:
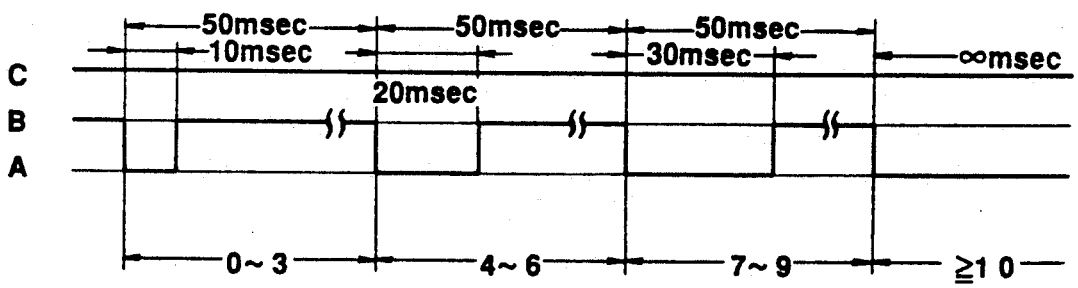
Figure 18D:
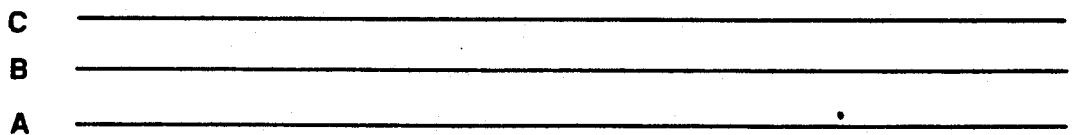

As shown in FIG. 18(c), the duty cycle in the LOW RATE RELEASE mode is variable depending upon the RELEASE mode control counter value RMCC. Namely, when the LOW RATE RELEASE mode is selected at the step 601 while the LOW pressure representative flag LPFL is set, the LOW RATE RELEASE mode counter value LRRMC is checked at the step 663. At the initial stage, since the LOW RATE RELEASE mode counter value LRRMC is held zero (0), the answer at the step 663 becomes negative. At this time, since the RELEASE mode control counter value RMCC is held zero (0), the answer at the step 665 becomes positive and the answer at the step 666 becomes also positive. Therefore, the pressure control mode ordering the RELEASE mode to place the traction control valve 40L at the normal valve position (A) is output at the step 693 after incrementing the LOW RATE RELEASE mode counter value LRRMC by one (1) at the step 670.

In the subsequent cycle, since the answer at the step 666 becomes negative because the LOW RATE RELEASE mode counter value LRRMC is other than zero (0), then process goes to the step 692 to place the traction control valve 40L at the pressure holding mode (B) via the step 667. The process of the steps 662, 663, 665, 666, 667 and 692 is repeated until the LOW RATE RELEASE mode counter value LRRMC becomes give (5). When the LOW RATE RELEASE mode counter value LRRMC becomes five (5), then the RELEASE mode control counter RMCC is incremented by one at the step 669.

When the RELEASE mode control counter value RMCC reaches three, the answer at the step 665 becomes negative. Therefor process goes to the step 671.

The process of the steps 662, 663, 665, 671, 673 and 692 or 693 for decreasing braking pressure with two-fifth of duty cycle. By repeating this process, the RELEASE mode control counter RMCC reaches six (6). Therefore, the answer at the step 671 becomes negative. Therefore, the process of the steps 662, 663, 665, 671, 675, 676 and 692 or 693 is repeatedly performed for three-fifth duty cycle of braking pressure decreasing operation. When the RELEASE mode control counter RMCC becomes greater than or equal to nine (9), then the LOW pressure representative flag LPFL is set at the step 677 and continuously perform pressure decreasing operation.

On the other hand, when the HIGH RATE RELEASE mode is selected at the step 601, the braking pressure is continuously decreased. During this HIGH RATE RELEASE mode operation, the HIGH RATE RELEASE mode counter value HRRMC is incremented per every cycle until the counter value reaches ten (10) at the step 684. When the HIGH RATE RELEASE mode counter value reaches ten (10), the LOW pressure representative flag LPFL is reset at the step 685.

Figure 20A:
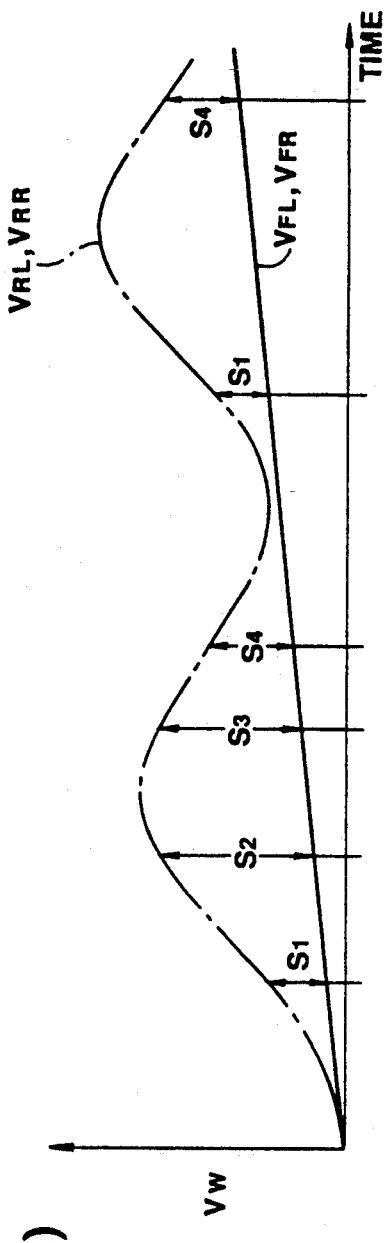
FIG. 20 is a timing chart showing example of practical operation of the engine output control in the preferred embodiment of the traction control system according to the present invention.
Figure 20B:
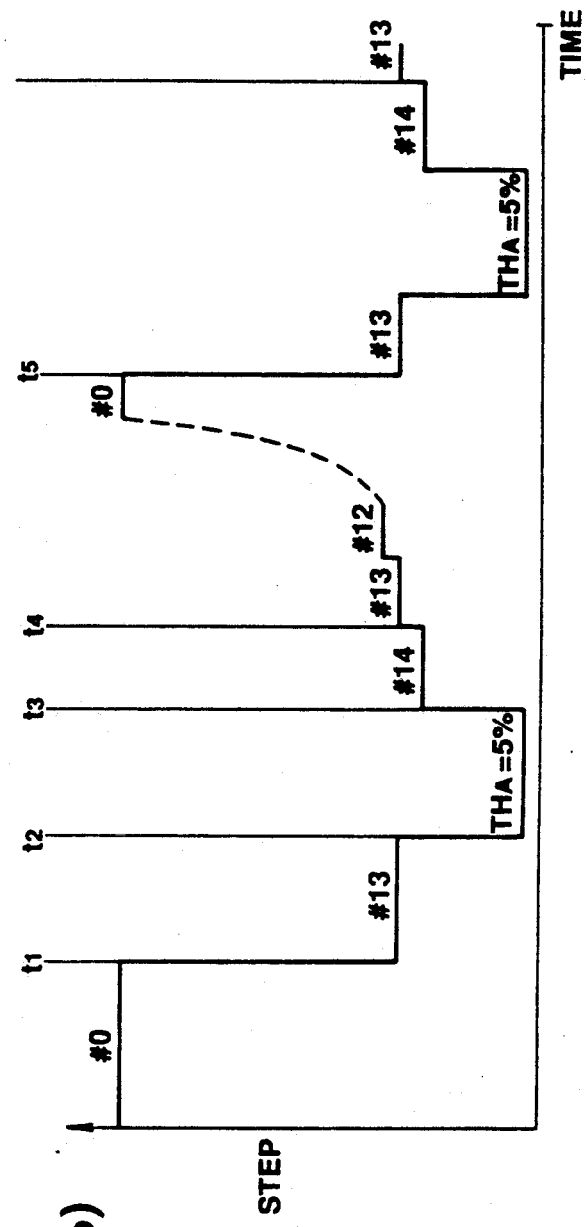
Figure 21A:
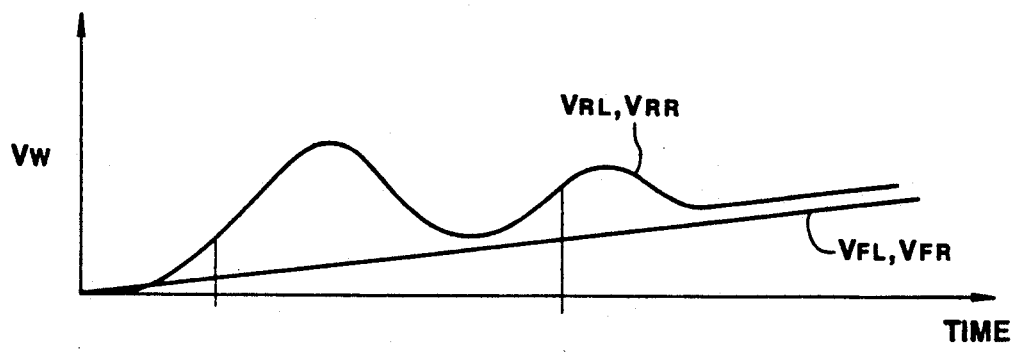
FIG. 21(a)–21(d) is a chart showing variation of brake control mode depending upon the wheel slippage and wheel slippage variation magnitude.
Figure 21B:
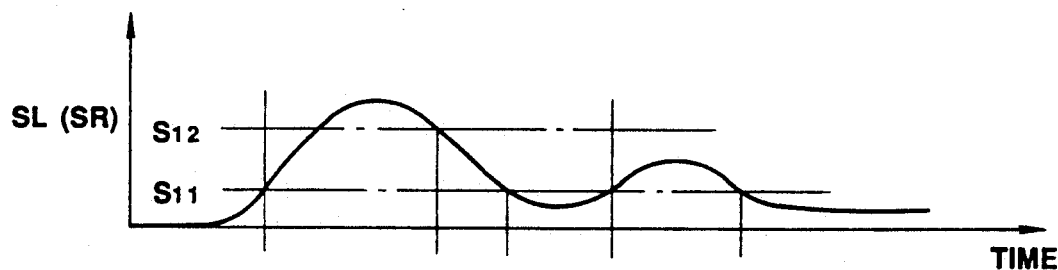
Figure 21C:
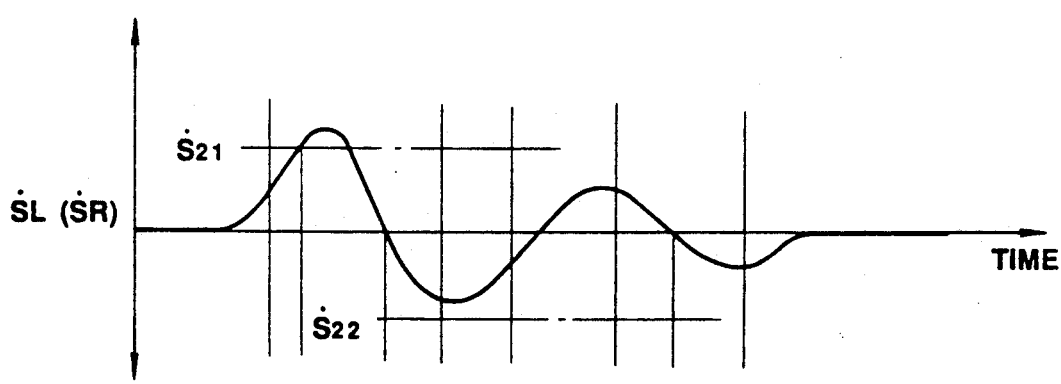
Figure 21D:
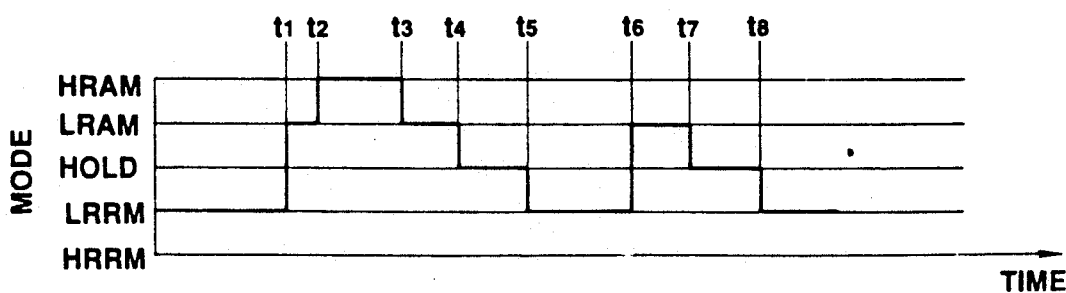

FIG. 20 shows practical implementation of the engine output control for suppressing wheel slippage. In the shown example, the driving wheel speed $V_{RL}$ and $V_{RR}$ varies in unison and as illustrated by one-dotted line in FIG. 20. The driven wheel speeds $V_{FL}$ and $V_{FR}$ also varies in unison and as illustrated by solid line.

As seen, until the time $t_1$ of FIG. 20, the weighted mean $S_{av}$ of the wheel slippage $S_L$ and $S_R$ is smaller than a first criterion $S_1$. Therefore, the throttle open angle characteristics indicative value MAPFLG is maintained No. 0 to permit normal throttle angular displacement according to the magnitude of depression of the accelerator pedal 6. Before the time $t_1$, the throttle open angle characteristics indicative value MAPFLG is maintained zero (0). Therefore, the slip area indicative data AREA and the first and second wheel slippage indicative data FLAGA and FLAGB are both set to zero (0) at steps 214, 215 and 216. On the other hand, when the weighted mean $S_{av}$ becomes greater or equal to the first wheel slippage criterion $S_1$, the answer at the step 151 becomes positive. At this time, since the throttle open angle characteristics indicative data MAPFLG is zero (0), the answer at the step 202 is positive. Therefore, the first wheel slippage indicative flag FLAGA is set at the step 203. At this time, since the throttle open angle characteristics indicative data MAPFLG is zero (0), the answer at the step 204 is negative and the answer at the step 218 becomes positive. Therefore, at the step 217, the throttle open angle characteristics indicative value MAPFLG is set at No. 13.

As long as the weighted mean $S_{av}$ is maintained smaller than the second wheel slippage criterion $S_2$, the steps of 202, 203, 204, 218, 205 and 217 are repeated for incrementing the throttle open angle characteristics indicative data MAPFLG at the step 205.

When the weighted mean $S_{av}$ further increases to be greater or equal to the second wheel slippage criterion $S_2$ at a time $t_2$, the answer at the step 206 becomes positive. Therefore, the slippage indicative area AREA is set to two (2) at the step 207. Since the second wheel slippage indicative data FLAGB is zero (0), the value FLAGB is set at the step 209. By setting the slip area indicative data AREA two at the step 207, the answer at the step 501 becomes positive. Therefore, the throttle open angle characteristics indicative value MAPFLG is set at a value corresponding to 5% at the step 507. At the same time, the throttle open angle characteristics indicative data MAPFLG is incremented at the step 211. Therefore, in the shown embodiment, the throttle open angle characteristics indicative data MAPFLG is set at 14 at the time $t_2$.

On the other hand, when the weighted means $S_{av}$ is decreased across the third wheel slippage criterion $S_3$ at a time $t_3$, the answer at the step 301 becomes negative. During the period between $t_3$ to $t_4$, since the weighted mean $S_{av}$ is greater than the fourth wheel slippage criterion $S_4$, the slip area indicative data AREA is set at one (1) at a step 304. Therefore, the answer at the step 501 becomes negative. This causes termination of the slip suppressive throttle angle control.

In the shown example, since the weighted mean $S_{av}$ becomes greater than or equal to the second wheel slippage criterion $S_2$ when the throttle open angle characteristics indicative data MAPFLG is 14, the value of MAPFLG is 14 at the time $t_3$. After the time $t_3$, the throttle open angle characteristics indicative data MAPFLG thus maintained at the value 14. When the weighted mean $S_{av}$ becomes smaller than or equal to the fourth wheel slippage criterion $S_4$, the answer at the step 303 becomes negative at the time $t_4$. Therefore, the slip area indicative data AREA is set at zero (0) at a step 305. Then, the throttle open angle characteristics indicative data MAPFLG is decremented to zero (0) through the steps 401, 402, 403, 404, 405, 406 and 407.

FIG. 21 shows the practical example of brake control for suppressing wheel slippage. In the shown example, the driving wheel speeds $V_{RL}$ and $V_{RR}$ are assumed to vary in unison and as shown, and the driven wheel speed $V_{FL}$ and $V_{FR}$ vary in unison and as shown. When the wheel slippage $S_L$ becomes greater than a first brake mode selecting criterion $S_{11}$ at a time $t_{11}$, the LOW RATE APPLICATION mode is selected. At a time $t_{12}$, the variation magnitude $\dot{S}_L$ increases across an acceleration threshold $S_{21}$, the mode is switched from the LOW RATE APPLICATION mode to the HIGH RATE APPLICATION mode. By increasing braking pressure in the HIGH RATE APPLICATION mode, variation magnitude $\dot{S}_L$ is decreased across a zero value, at a time $t_{13}$. Then, the LOW RATE APPLICATION mode is again selected. During this period, the wheel slippage $S_L$ varies to increase across the second brake mode selecting criterion $S_{12}$ and subsequently to decrease across the second brake mode selecting criterion. At a timing $t_{14}$, at which the wheel slippage $S_L$ decreases across the second brake mode selecting criterion $S_{12}$, the HOLD mode is selected. By holding the braking pressure constant, the wheel slippage $S_L$ decreases across the first brake mode selecting criterion $S_{11}$ at a time $t_{15}$. As long as the wheel slippage $S_L$ is maintained smaller than the first brake mode selecting criterion $S_{11}$, the brake mode is maintained at the LOW RATE RELEASE mode. Similar mode selection is performed through the period over timings $t_{16}$, $t_{17}$ and $t_{18}$.

The procedure for selecting brake operation mode is performed with respect to the right driving wheels.

As will be appreciated herefrom, since the present invention can vary variation rate of braking pressure according to variation of the wheel slippage and variation magnitude of wheel slippage, it becomes possible to optimize wheel slippage suppressing operation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A traction control system for an automotive vehicle comprising:
   first means, associated with an automotive engine and a manually operable accelerator means, for controlling engine output;
   second means, associated with an automotive brake system, for adjusting braking pressure to be generated in a wheel cylinder of a driving wheel which is coupled with said automotive engine to receive said engine output so as to be driven by said engine output;
   third means for monitoring rotation speed of said driving wheel to produce a driving wheel speed indicative signal;
   fourth means for monitoring a vehicular body speed representative parameter for producing a vehicular body speed representative signal;
   fifth means for deriving wheel slippage on said driving wheel on the basis of said wheel speed indicative signal and said vehicular body speed representative signal;
   sixth means for generating a first control signal on the basis of said wheel slippage for controlling operation of said first means in order to adjust said engine output for suppressing said wheel slippage; and
   seventh means for generating a second control signal on the basis of said wheel slippage for operating said second means for adjusting said braking pressure in order to suppress said wheel slippage, said seventh means varying a variation rate of said braking pressure according to a magnitude of said wheel slippage and a rate of variation of said wheel slippage.

2. A traction control system as set forth in claim 1, wherein said second means is operable in a first mode for increasing said braking pressure in said wheel cylinder and a second mode for decreasing said braking pressure in said wheel cylinder, and said seventh means varies said variation rate of said braking pressure at least in one of said first and second modes.

3. A traction control system as set forth in claim 2, wherein said second means is further operable in a third mode for holding constant said braking pressure in said wheel cylinder, and said seventh means varies said variation rate of said braking pressure by alternating a mode of said second means between at least one of said first and second modes said third mode.

4. A traction control system as set forth in claim 2, wherein said second means comprises:
   a first valve means disposed within a brake circuit connecting said wheel cylinder to a braking pressure source which is associated with a manually operable braking member to generate a fluid pressure to be supplied to said wheel cylinder depending upon a magnitude of depression of said braking member, said first valve means being operable in a normal mode position in sad second mode of said second means to establish communication of said wheel cylinder with said pressure source for controlling braking pressure depending upon said magnitude of depression of said braking member, and in a traction control mode in said first mode of said second means for disconnecting said wheel cylinder from said pressure source and forming a closed circuit including said wheel cylinder to compress a working fluid therein for increasing braking force in said wheel cylinder; and
   a second valve means associated with said first valve means and controlled by said second means, for switching the operational mode between said normal mode and said traction control mode.

5. A traction control system as set forth in claim 4, wherein said first valve means operates to increase said braking pressure in said wheel cylinder and to hold said braking force constant, in said traction control mode.

6. A traction control system as set forth in claim 3, wherein said second means comprises:
   a first valve means disposed within a brake circuit connecting said wheel cylinder to a braking pressure course which is associated with a manually operable braking member to generate a fluid pressure to be supplied to said wheel cylinder depending upon a magnitude of depression of said braking member, said first valve means being operable in a normal mode position in said second mode of said second means to establish communication of said wheel cylinder with said pressure source for controlling said braking pressure depending upon said magnitude of depression of said braking member, in a first traction control mode in said first mode of said second means for disconnecting said wheel cylinder from said pressure source and forming a closed circuit including said wheel cylinder to compress a working fluid therein for increasing said braking force in said wheel cylinder, and in a second traction mode in said third mode of said second means for blocking fluid communication of said wheel cylinder to maintain said braking pressure constant; and
   a second valve means associated with said first valve means and controlled by said second means, for switching the operational mode between said normal mode and said traction control mode.

7. A traction control system as set forth in claim 6, wherein said first valve means is connected to a pressurized working fluid source to be supplied a pressurized working fluid therefrom.

8. A traction control system as set forth in claim 7, wherein said pressurized working fluid source includes a working fluid pump unit and a pressure accumulator which are cooperative for maintaining the fluid pressure supplied to said first valve means higher than a predetermined value.

9. A traction control system as set forth in claim 1, wherein said seventh means derives said variation rate of said braking pressure in said wheel cylinder on the basis of said slippage and said rate of variation of said wheel slippage.

10. A traction control system as set forth in claim 9, wherein said seventh means controls said second means for increasing said braking pressure at a first higher rate and a second lower rate depending upon said magnitude of said wheel slippage and said rate of variation of said wheel slippage.

11. A traction control system as set forth in claim 10, wherein said seventh mean selects said second lower rate in response to increasing of said magnitude of said wheel slippage across a predetermined wheel slippage criterion and selects said first higher rate when said rate of variation of said wheel slippage increases across a predetermined wheel slippage variation rate criterion.

12. A traction control system as set forth in claim 9, wherein said seventh means controls said second means for decreasing said braking pressure at a first higher rate and a second lower rate depending upon said magnitude of said wheel slippage and said rate of variation of said wheel slippage.

13. A traction control system as set forth in claim 12, wherein said seventh means selects a fourth lower rate in response to zero-crossing of a decreasing variation rate of said wheel slippage and selects a third higher rate when said magnitude of said wheel slippage decreases across a predetermined wheel slippage criterion.

14. A traction control system as set forth in claim 13, high further comprises means for measuring an elapsed time in a period to maintain decreasing of said braking pressure in said fourth lower rate, and said seventh means further varies said variation rate of said braking pressure depending upon said elapsed time while said braking pressure is decreased in said fourth lower rate.

15. A traction control system as set forth in claim 10, wherein said seventh means controls said second means for decreasing said braking pressure at a first higher rate and a second lower rate depending upon said magnitude of said wheel slippage and said rate of variation of said wheel slippage.

16. A traction control system as set forth in claim 15, wherein said seventh means selects said second lower rate in response to increasing of said magnitude of said wheel slippage across a predetermined wheel slippage criterion and selects said first higher rate when said rate of variation of said wheel slippage increases across a predetermined wheel slippage variation rate criterion.

17. A traction control system as set forth in claim 16, wherein said seventh means selects a fourth lower rate in response to zero-crossing of a decreasing variation rate of said wheel slippage and selects a third higher rate when said magnitude of said wheel slippage decreases across a predetermined wheel slippage criterion.

18. A traction control system as set forth in claim 17, which further comprises means for measuring an elapsed time in a period to maintain decreasing of said braking pressure in said fourth lower rate, and said seventh means further varies said variation rate of said braking pressure depending upon said elapsed time while said braking pressure is decreased in said fourth lower rate.

19. A traction control system as set forth in claim 1, wherein said sixth means operates said first means for adjusting a characteristic throttle valve angular displacement in relation to an operational magnitude of said accelerator means depending upon said magnitude of said wheel slippage.

20. A traction control system as set forth in claim 19, wherein said sixth means operates to limit a maximum throttle valve open angle to a limited throttle valve open angle depending upon said magnitude of said wheel slippage.

21. A traction control system as set forth in claim 20, wherein said sixth means periodically decreases said limited maximum throttle valve open angle while said magnitude of said wheel slippage is maintained greater than or equal to a predetermined first wheel slippage threshold value.

22. A traction control system as set forth in claim 21, wherein said sixth means is responsive to said magnitude of said wheel slippage greater than or equal to a predetermined wheel slippage threshold for setting said limited maximum throttle open angle at a predetermined minimum value.

* * * * *